United States Patent
Gao et al.

(10) Patent No.: US 10,576,859 B2
(45) Date of Patent: Mar. 3, 2020

(54) ARRAY TYPE AUTOMOBILE SEAT PROFILE ADAPTIVE-ADJUSTING APPARATUS AND METHOD

(71) Applicant: Jilin University, Changchun (CN)

(72) Inventors: Zhenhai Gao, Changchun (CN); Chuanliang Shen, Changchun (CN); Binyu Zhou, Changchun (CN); Tairong Sun, Changchun (CN); Fei Gao, Changchun (CN)

( * ) Notice: Subject to any disclaimer, the term of this patent is extended or adjusted under 35 U.S.C. 154(b) by 152 days.

(21) Appl. No.: 15/844,547

(22) Filed: Dec. 17, 2017

(65) Prior Publication Data
US 2019/0135150 A1 May 9, 2019

(30) Foreign Application Priority Data
Nov. 9, 2017 (CN) .......................... 2017 1 1102422

(51) Int. Cl.
*B60N 2/70* (2006.01)
*B60N 2/64* (2006.01)

(52) U.S. Cl.
CPC ........... *B60N 2/7047* (2013.01); *B60N 2/643* (2013.01); *B60N 2/646* (2013.01); *B60N 2/7029* (2013.01)

(58) Field of Classification Search
USPC ................ 297/284.3, 284.4, 284.8, 284.6
See application file for complete search history.

(56) References Cited

U.S. PATENT DOCUMENTS

| | | | | |
|---|---|---|---|---|
| 8,616,654 B2* | 12/2013 | Zenk | ...................... | B60N 2/914 297/452.41 |
| 9,744,887 B2* | 8/2017 | Durt | ...................... | A61H 9/0078 |
| 10,046,671 B2* | 8/2018 | Seiller | .................. | B60N 2/0248 |
| 10,363,852 B2* | 7/2019 | Strumolo | ................. | B60N 2/99 |
| 2006/0238006 A1* | 10/2006 | Baranov | .................. | A47C 1/03 297/284.3 |
| 2009/0224587 A1* | 9/2009 | Lawall | ................. | B60N 2/0224 297/353 |
| 2015/0251580 A1* | 9/2015 | Sachs | ................... | A61H 9/0078 297/180.13 |
| 2018/0134191 A1* | 5/2018 | Ketels | .................... | B60N 2/501 |

* cited by examiner

*Primary Examiner* — David E Allred
(74) *Attorney, Agent, or Firm* — Erson IP (Nelson IP)

(57) ABSTRACT

The present invention provides an array type automobile seat profile adaptive-adjusting apparatus, comprising a seat back plate, a seat bottom plate, a seat profile layer covered thereon and a plurality of shape memory material actuators which are arranged in a rectangular array and are disposed between the seat profile layer and the seat back plate and between the seat profile layer and the seat bottom plate, wherein each of the shape memory material actuators comprises a plurality of sequentially nested sleeves, a return spring through which an outwardly extending elastic force is applied to the sleeves, a pulley block fixedly arranged in the sleeve located at a tail end, and a memory alloy wire which is in a shape of filament and is wound on the pulley block.

8 Claims, 13 Drawing Sheets

ARRAY TYPE AUTOMOBILE SEAT PROFILE ADAPTIVE-ADJUSTING APPARATUS AND METHOD

FIELD OF THE INVENTION

The present invention belongs to the technical field of automobile seat riding comfort, and particularly relates to an array type automobile seat profile adaptive-adjusting apparatus.

BACKGROUND OF THE INVENTION

With innovation of automobile products, people have increasingly high requirements for automobile riding comfort. As an important comfort component of an automobile, the automobile seat provides the comfort which directly affects the comfort of an entire automobile. An existing automobile seat usually only controls a sitting posture of a person, and is adjusted by limited parameters such as a backrest angle, a seat height, a front-back position, a lumbar support position, a cushion angle and the like. Since the existing automobile seat usually adopts a fixed seat profile, the comfort is only designed for a certain percentage of occupants and cannot meet demands of an entire purchasing crowd for personalized comfort configuration.

As a typical smart material, a shape memory material has characteristics of large deformation, high energy density and small impact, is used as a driving element of an execution unit of an array type automobile seat profile adjusting system, and can be combined with a mechanical structure and an electronic control unit to realize adaptive adjustment of a seat profile, thereby improving the riding comfort of drivers and occupants.

SUMMARY OF THE INVENTION

A purpose of the present invention is to overcome defects that an existing seat profile is fixed and a profile shape cannot be adjusted according to actual situations of occupants, so as to provide an array type automobile seat profile adaptive-adjusting apparatus.

Another purpose of the present invention is to provide an array type automobile seat profile adaptive-adjusting method to improve riding comfort of the occupants.

The present invention provides technical solutions as follows:

an array type automobile seat profile adaptive-adjusting apparatus comprises:

a seat back plate, a seat bottom plate, and a seat profile layer covered thereon; and a plurality of shape memory material actuators arranged and disposed between the seat profile layer and the seat back plate and/or between the seat profile layer and the seat bottom plate.

Each of the shape memory material actuators comprises:

a plurality of sequentially nested sleeves, wherein the sleeve located at a tail end is fixed to the seat back plate and the seat bottom plate, and the sleeve located at a front end is fixed to the seat profile layer;

a return spring, wherein one end of the return spring is connected with a bottom surface of the sleeve located at the tail end, the other end of the return spring is connected with a top surface of the sleeve located at the front end, and an outwardly extending elastic force is applied to the sleeves through the return spring;

a pulley block fixedly arranged in the sleeve located at the tail end; and a memory alloy wire wound on the pulley block, wherein one end of the memory alloy wire is connected with the bottom surface of the sleeve located at the tail end, the other end is connected with the top surface of the sleeve located at the front end, and the memory alloy wire is shortened during energization.

Preferably, the seat profile layer comprises an inner profile supporting layer and an outer elastic covering layer.

Preferably, a plurality of protrusions are further disposed inside the profile supporting layer; and the protrusions are fixedly connected with the top of the sleeve located at the front end.

Preferably, the apparatus further comprises a controller electrically connected with the memory alloy wire through a multi-core cable to energize the memory alloy wire.

Preferably, the pulley block comprises:

two supporting vertical columns arranged in parallel, wherein the supporting vertical columns are fixed to the sleeve located at the tail end;

two rotating shafts arranged in parallel, wherein both ends of the rotating shafts are respectively fixed to the two supporting vertical columns; and a plurality of pulleys rotatably disposed on the rotating shafts.

Preferably, pressure sensors are disposed on the shape memory material actuators to measure pressure from an external load acting on the shape memory material actuators.

Preferably, temperature sensors are disposed in the shape memory material actuators to measure a temperature of the memory alloy wire.

Preferably, resistance measurers are disposed in the shape memory material actuators to measure a resistance value.

An array type automobile seat profile adaptive-adjusting apparatus comprises:

a seat back plate, a seat bottom plate, and a seat profile layer covered thereon; and a plurality of shape memory material actuators arranged and disposed between the seat profile layer and the seat back plate and/or between the seat profile layer and the seat bottom plate.

Each of the shape memory material actuators comprises:

a plurality of sequentially nested sleeves, wherein the sleeve located at a tail end is fixed to the seat back plate and/or the seat bottom plate, and the sleeve located at a front end is fixed to the seat profile layer;

a return spring, wherein one end of the return spring is connected with a bottom surface of the sleeve located at the tail end, the other end of the return spring is connected with a top surface of the sleeve located at the front end, and the return spring applies an inwardly contracting pulling force to the sleeves;

a pulley block fixed in the sleeve; and a memory alloy wire wound on the pulley block, wherein both ends of the memory alloy wire are connected with two adjacent sleeves, the memory alloy wire is shortened during energization and the two adjacent sleeves extend out.

Preferably, the seat profile layer comprises an inner profile supporting layer and an outer elastic covering layer.

Preferably, a plurality of protrusions are further disposed inside the profile supporting layer; and the protrusions are fixedly connected with the top of the sleeve located at the front end.

Preferably, the apparatus further comprises a controller electrically connected with the memory alloy wire through a multi-core cable to energize the memory alloy wire.

Preferably, the pulley block comprises:
a plurality of pulleys; and
rotating shafts which penetrate through centers of the pulleys so that the pulleys can rotate about the rotating shafts, wherein both ends of the rotating shafts are respectively fixed on inner walls of the sleeves.

Preferably, pressure sensors are disposed on the shape memory material actuators to measure pressure from an external load acting on the shape memory material actuators.

Preferably, temperature sensors are disposed in the shape memory material actuators to measure a temperature of the memory alloy wire.

Preferably, resistance measurers are disposed in the shape memory material actuators to measure a resistance value.

An array type automobile seat profile adaptive-adjusting method comprises the following steps:

step one, acquiring pressure values on shape memory material actuators arranged in a rectangular array to obtain a measurement pressure matrix and the pressure value on each of the shape memory material actuators, and setting the shape memory material actuators with the pressure values greater than or equal to a set threshold value as valid actuators;

step two, respectively calculating pressure differences between the measurement pressure matrix and corresponding points in a plurality of prestored pressure matrixes to obtain deviation matrixes;

step three, respectively calculating variance of data in each of the deviation matrixes, and using the prestored pressure matrix corresponding to the deviation matrix with the smallest variance as an ideal matrix; and step four, controlling the amount of extension and contraction of the valid actuators so that pressure data outputted by the valid actuators are same as the corresponding pressure data in the ideal matrix.

Preferably, the method further comprises:

step five, setting the shape memory material actuators with the pressure values less than the set threshold value as invalid actuators, and controlling a circle of invalid actuators outside a region surrounded by the valid actuators to extend so as to wrap the occupants.

Preferably, in the step four and the step five, the memory alloy wires in the shape memory material actuators are energized and heated in a manner of pulse width modulation so as to change the amount of extension and contraction of the shape memory material actuators.

Preferably, in the step four and the step five, the heat quantity Q of the shape memory actuators is calculated by the following formula:

$$Q=\Sigma(I^2 *R*\Delta t)-Q(t)$$

In the formula, I is measured current of the memory alloy wire; R is resistance of the memory alloy wire; $\Delta t$ is a sampling interval time; and Q(t) is heat transferred to the outside by the actuators.

The present invention has beneficial effects that the array type automobile seat profile adaptive-adjusting apparatus and method provided by the present invention can adaptively control the seat profile for the occupants different in human dimensions to improve the riding comfort, and can switch different driving modes according to demands to improve driving experience. An array distribution manner of a plurality of telescopic shape memory actuators is adopted; human characteristic parameters are identified by sensing pressure distribution between a human body and the seat profile; and the amount of extension and contraction of each of the actuators is adjusted in combination with ideal human pressure distribution so that an optimal human pressure value is achieved between the human body and the seat profile, thereby meeting personalized demands of the drivers and occupants different in human body percentile and physically disabled drivers and occupants on the seat riding comfort, improving a technical level of an existing seat system, and enhancing market competitiveness of related automobile products.

DETAILED DESCRIPTION OF THE EMBODIMENTS

The present invention is further described in detail below in combination with drawings, so that those skilled in the art can implement the present invention with reference to texts of the description.

Figure 1:
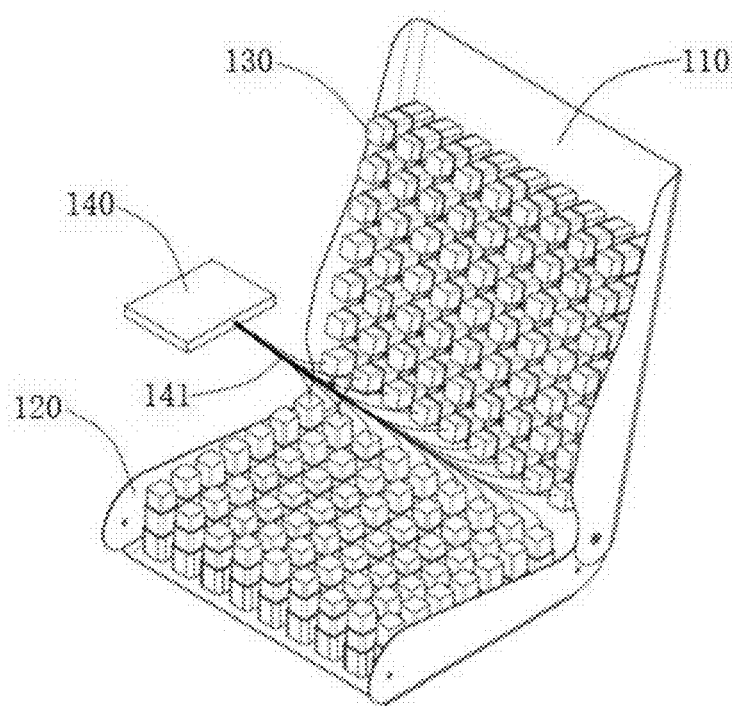
FIG. 1 is a schematic diagram of an overall structure of an array type automobile seat profile adaptive-adjusting apparatus according to the present invention.

As shown in FIG. 1, the present invention provides an array type automobile seat profile adaptive-adjusting apparatus which comprises a seat back plate 110 and a seat bottom plate 120, wherein the seat back plate 110 is hinged with the seat bottom plate 120. A plurality of shape memory material actuators 130 arranged in a rectangular array are disposed on the seat back plate 110, wherein the shape memory material actuators 130 are perpendicular to a surface of the seat back plate 110, and one end of each of the shape memory material actuators 130 is fixed to the seat back plate 110. A plurality of shape memory material actuators 130 arranged in the rectangular array are also disposed on the seat bottom plate 120, wherein the shape memory material actuators 130 are perpendicular to the surface of the seat bottom plate 120, and one end of each of the shape memory material actuators 130 is fixed to the seat bottom plate 120. A controller 140 is mutually connected with each of the shape memory material actuators 130 through a multi-core cable 141.

Figure 2:
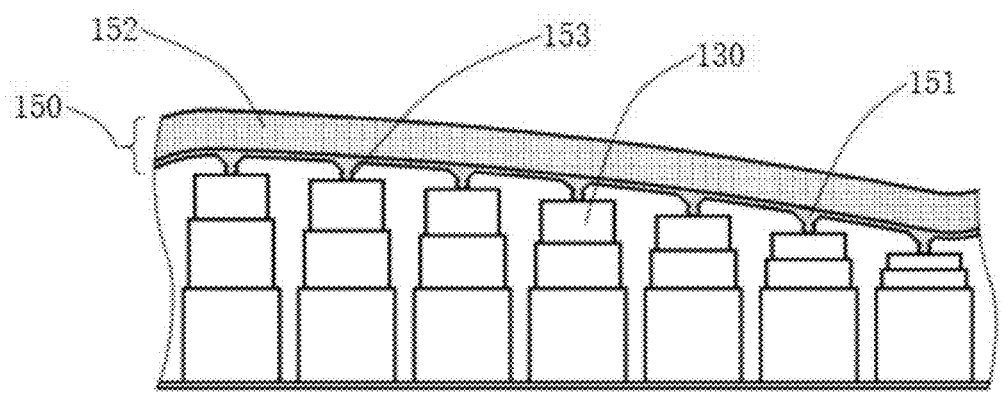
FIG. 2 is a schematic diagram of a connecting structure for a seat profile layer and actuators according to the present invention.

As shown in FIG. 2, a seat profile layer 150 is coated outside the shape memory material actuators 130. Taking the seat back plate 110 as an example, the seat profile layer 150 is coated outside the shape memory material actuators 130 so that the shape memory material actuators 130 are coated between the seat back plate 110 and the seat profile layer 150. Similarly, the seat profile layer 150 is pressed and coated outside the shape memory material actuators 130 on the seat bottom plate 120 so that the shape memory material actuators 130 are coated between the seat bottom plate 120 and the seat profile layer 150.

Figure 3:
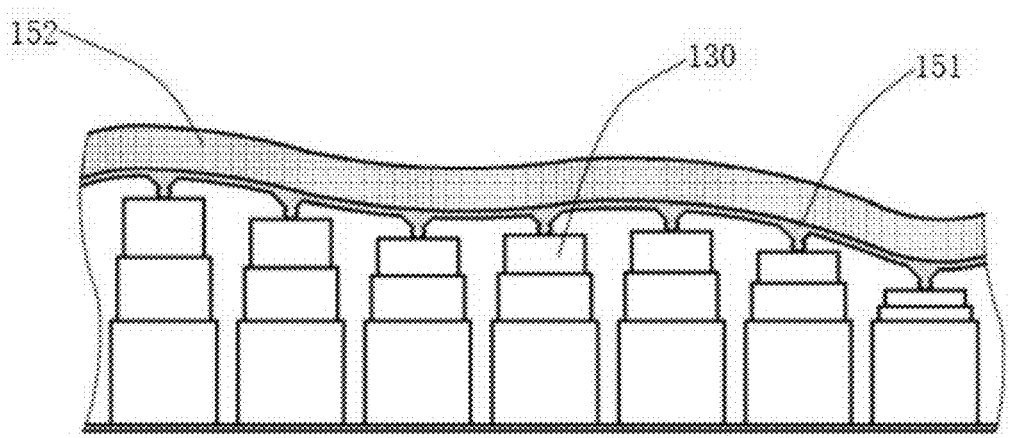
FIG. 3 is a schematic diagram of an actuator control seat profile according to the present invention.

The seat profile layer 150 comprises an inner profile supporting layer 151 and an outer elastic covering layer 152. The profile supporting layer 151 is connected with one end of each of the shape memory material actuators 130 by a protrusion 153. The controller 140 controls the amount of extension and contraction of each of the shape memory material actuators 130 by the multi-core cable 141 so that the seat profile layer 150 shows a specific profile as shown in FIG. 2 and FIG. 3.

Figure 4:
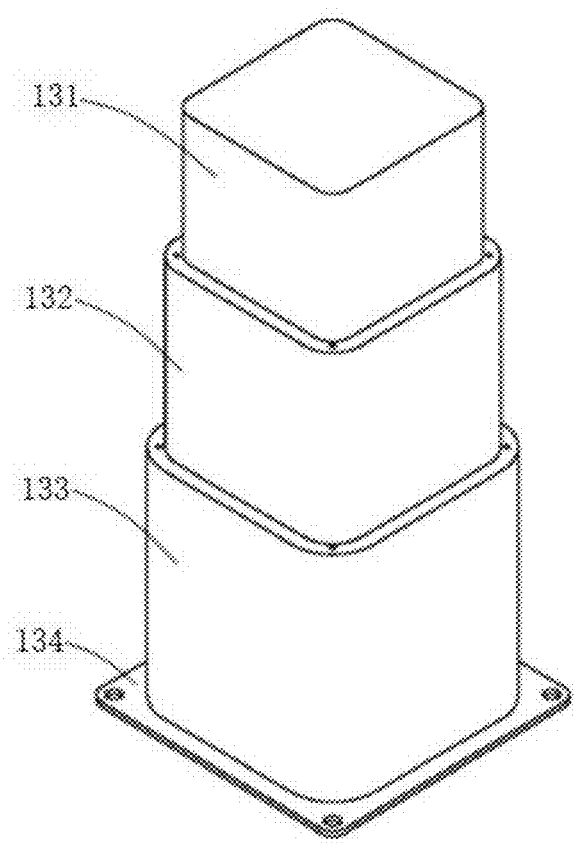
FIG. 4 is a structural schematic diagram of an actuator housing according to the present invention.

As shown in FIG. 4, a housing of each of the shape memory material actuators 130 comprises a first sleeve 131, a second sleeve 132, a third sleeve 133 and a bottom plate 134. The first sleeve 131 is nested in the second sleeve 132 so that the first sleeve 131 can slide relative to the second sleeve 132. The second sleeve 132 is nested in the third sleeve 133 so that the second sleeve 132 are can slide relative to the third sleeve 133. A bottom end of the third sleeve 133 is fixedly connected with the bottom plate 134. The bottom plate 134 is provided with mounting holes capable of fixing the bottom plate 134 to the seat back plate 110 or the seat bottom plate 120. The first sleeve 131, the second sleeve 132 and the third sleeve 133 are sequentially nested so that the housings of the shape memory material actuators 130 can extend and contract.

Driving mechanisms are disposed in the housings of the shape memory material actuators 130 and are used for driving the housings of the shape memory material actuators 130 to extend and contract.

Figure 5:
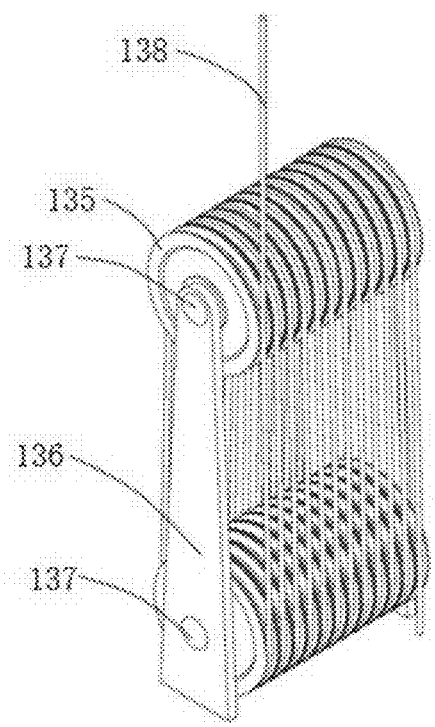
FIG. 5 is a structural schematic diagram of a pulley block in a contracted wire type shape memory pulley driving mechanism according to the present invention.

As shown in FIG. 5, the driving mechanisms are contracted wire type shape memory pulley driving mechanisms, and comprise pulleys 135, supporting vertical columns 136, rotating shafts 137 and memory alloy wires 138. Two supporting vertical columns 136 are disposed and are arranged on the left and right. Two rotating shafts 137 are also disposed, wherein both ends of one rotating shaft 137 are respectively fixed to one end of each of the two supporting vertical columns 136, and both ends of the other rotating shaft 137 are respectively connected with the other end of the two supporting vertical columns 136, i.e., the two rotating shafts 137 are arranged in parallel. A plurality of pulleys 135 are disposed and are closely mounted on the two rotating shafts 137; and the pulleys 135 can rotate about the rotating shafts 137. The memory alloy wires 138 are in a shape of filaments and are sequentially wound on each of the pulleys 135.

Figure 6:
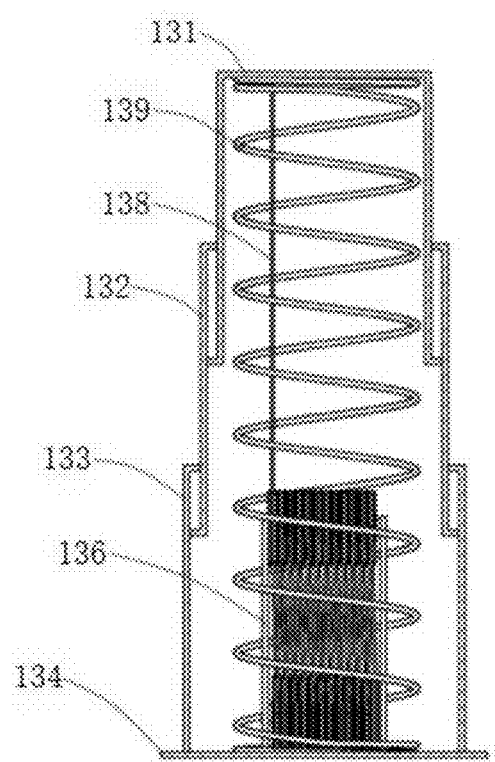
FIG. 6 is a schematic diagram of a driving actuator of a contracted wire type shape memory pulley driving mechanism in a maximum displacement position according to the present invention.

As shown in FIG. 6, a return spring 139 is further disposed in the housing of each of the shape memory material actuators 130, wherein one end of the return spring 139 is connected with the bottom plate 134, the other end is connected with a top end of the first sleeve 131, and an elastic force away from the bottom plate 134 is applied to the first sleeve 131 by the return spring 139. Each of the memory alloy wires 138 is sequentially wound on each of the pulleys 135. Moreover, one end of the memory alloy wire 138 is fixedly connected with the bottom plate 134, the other end is connected with the top end of the first sleeve 131; and a pulling force close to the bottom plate 134 is applied to the first sleeve 131 by the memory alloy wire 138. When the elastic force applied by the return springs 139 is balanced with the pulling force applied by the memory alloy wires 138, the first sleeve 131 is in a stable position.

As shown in FIG. 6, when no current flows in the memory alloy wires 138, lengths of the memory alloy wires 138 are the maximum lengths, and the shape memory material actuators 130 are in a maximum displacement position under the effect of the return springs 139, i.e., the first sleeves 131, the second sleeves 132 and the third sleeves 133 extend outwardly to the maximum position.

Figure 7:
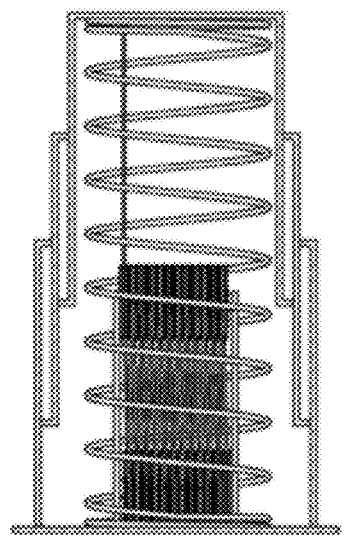
FIG. 7 is a schematic diagram of a driving actuator of a contracted wire type shape memory pulley driving mechanism in an intermediate displacement position according to the present invention.

As shown in FIG. 7, when the controller 140 sends an electrical signal to the memory alloy wires 138 for energizing and heating, the memory alloy wires 138 are contracted and become shorter, thereby pulling the first sleeves 131 to move by a certain position toward a direction close to the bottom plate 134. At this time, the shape memory material actuators 130 are in an intermediate displacement position.

Figure 8:
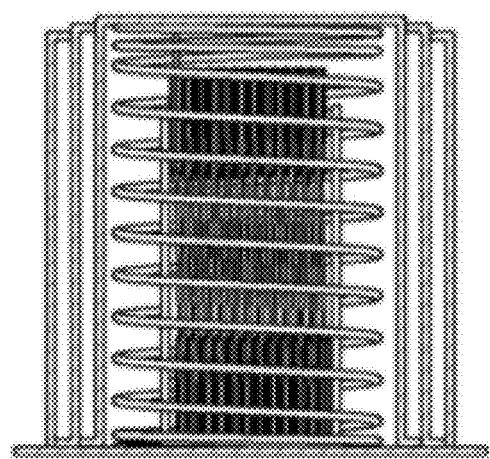
FIG. 8 is a schematic diagram of a driving actuator of a contracted wire type shape memory pulley driving mechanism in a minimum displacement position according to the present invention.

As shown in FIG. 8, when the energizing current of the memory alloy wires 138 is increased to the maximum current, the memory alloy wires 138 are contracted to a position at which the length is shortest. At this time, the first sleeves 131 are pulled to move toward the direction close to the bottom plate 134 to a completely contracted position, i.e., the shape memory material actuators 130 are in a minimum position state.

Figure 9:
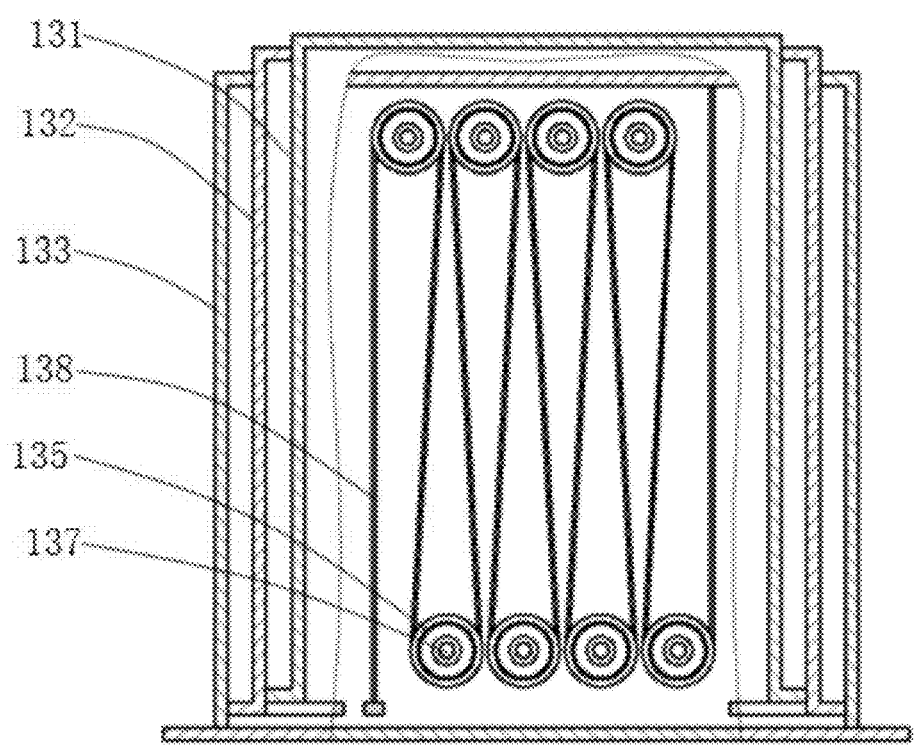
FIG. 9 is a structural schematic diagram of a pulley block in an extended wire type shape memory pulley driving mechanism according to the present invention.

As shown in FIG. 9, in another embodiment, the driving mechanisms are extended wire type shape memory pulley driving mechanisms, and comprise the pulleys 135, the rotating shafts 137 and the memory alloy wires 138. A plurality of pulleys 135 are arranged and are disposed in a same plane. The rotating shafts 137 penetrate through the pulleys 135 so that the pulleys 135 can rotate about the rotating shafts 137. Both ends of the rotating shafts 137 are respectively fixed to side walls of the third sleeves 133. The memory alloy wires 138 are in a shape of filaments and are sequentially wound on each of the pulleys 135. One end of each of the memory alloy wires 138 is fixed to the bottom plate 134, the other end is fixedly connected with the bottoms of the second sleeves 132, and the pulling force away from the bottom plate 134 is applied to the second sleeves 132 by the memory alloy wires 138.

Figure 10:
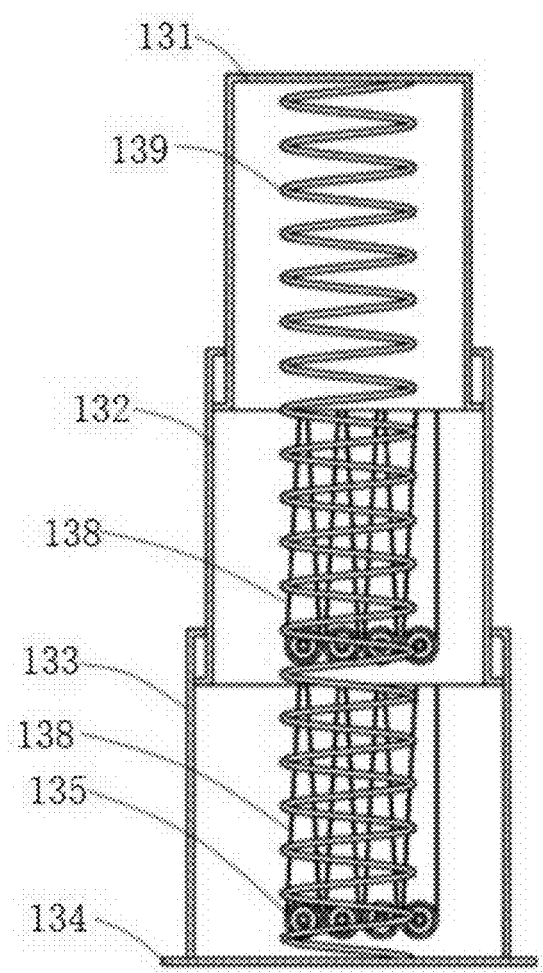
FIG. 10 is a schematic diagram of a driving actuator of an extended wire type shape memory pulley driving mechanism in a maximum displacement position according to the present invention.

As shown in FIG. 10, another group of driving mechanisms is further arranged, wherein both ends of the rotating shafts 137 are respectively fixed to the side walls of the second sleeves 132, and the pulleys 135 are nested on the rotating shafts 137. The memory alloy wires 138 are sequentially wound on each of the pulleys 135. One end of each of the memory alloy wires 138 is fixed to the second sleeves 132, the other end is fixedly connected with the bottoms of the first sleeves 131, and the pulling force extending outwardly relative to the second sleeves 132 is applied to the first sleeves 131 by the memory alloy wires 138.

The return spring 139 is further disposed in the housing of each of the shape memory material actuators 130, wherein one end of the return spring 139 is connected with the bottom plate 134, the other end is connected with the top end of the first sleeve 131, and the pulling force close to the bottom plate 134 is applied to the first sleeve 131 by the return spring 139.

Figure 12:
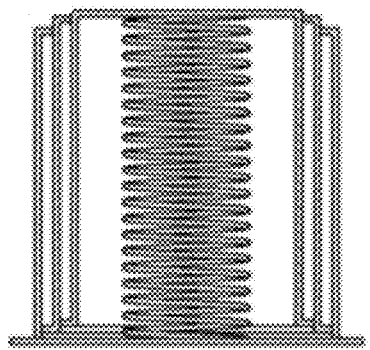
FIG. 12 is a schematic diagram of a driving actuator of an extended wire type shape memory pulley driving mechanism in a minimum displacement position according to the present invention.

As shown in FIG. 12, when no current flows in the two memory alloy wires 138, lengths of the memory alloy wires 138 are the maximum lengths, and the memory alloy wires 138 do not apply the pulling force away from the bottom plate 134 to the second sleeves 132 nor apply the pulling force extending outwardly relative to the second sleeves 132 to the first sleeves 131. At this time, the first sleeves 131 and the second sleeves 132 are in a completely contracted state under the effect of the return springs 139, and the shape memory material actuators 130 are in a minimum displacement position.

Figure 11:
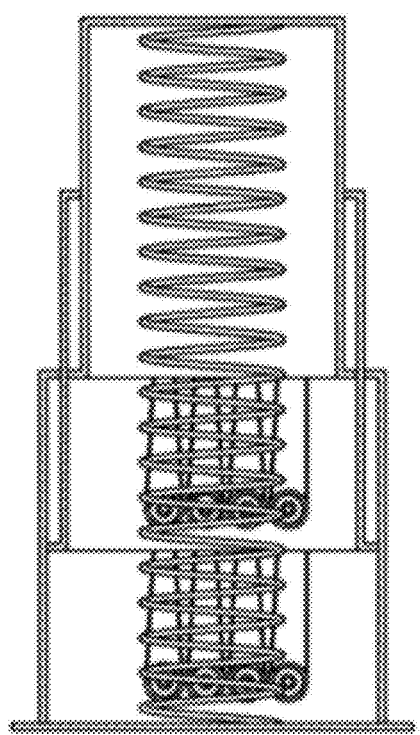
FIG. 11 is a schematic diagram of a driving actuator of an extended wire type shape memory pulley driving mechanism in an intermediate displacement position according to the present invention.

As shown in FIG. 11, when the controller 140 sends the electrical signal to the memory alloy wires 138 for energizing and heating, the memory alloy wires 138 are contracted and become shorter, thereby pulling the second sleeves 132 to extend out relative to the third sleeves 133 and pulling the first sleeves 131 to extend out relative to the second sleeves 132. At this time, the shape memory material actuators 130 are in the intermediate displacement position.

As shown in FIG. 10, when the energizing current of the memory alloy wires 138 is increased to the maximum current, the memory alloy wires 138 are contracted to a position at which the length is shortest. At this time, the memory alloy wires 138 may pull the first sleeves 131 to completely extend out relative to the second sleeves 132 and pull the second sleeves 132 to completely extend out relative to the third sleeves 133. At this time, the shape memory material actuators 130 are in the maximum displacement position.

Materials of the memory alloy wires are preferably Ni—Ti-based shape memory materials and certainly also contain other materials which can be controlled in shape changes through temperature, such as Au—Cd, Cu—Zn, Cu—Zn—Al, CuZn—Sn, Ni—Ti—Pd and the like.

Through the above configuration, the amount of extension and contraction of the shape memory material actuators 130 is changed by the driving mechanisms so that the shape memory material actuators 130 are in specific displacement positions according to set requirements, and thus the seat profile layer 150 shows a specific shape.

Figure 13:
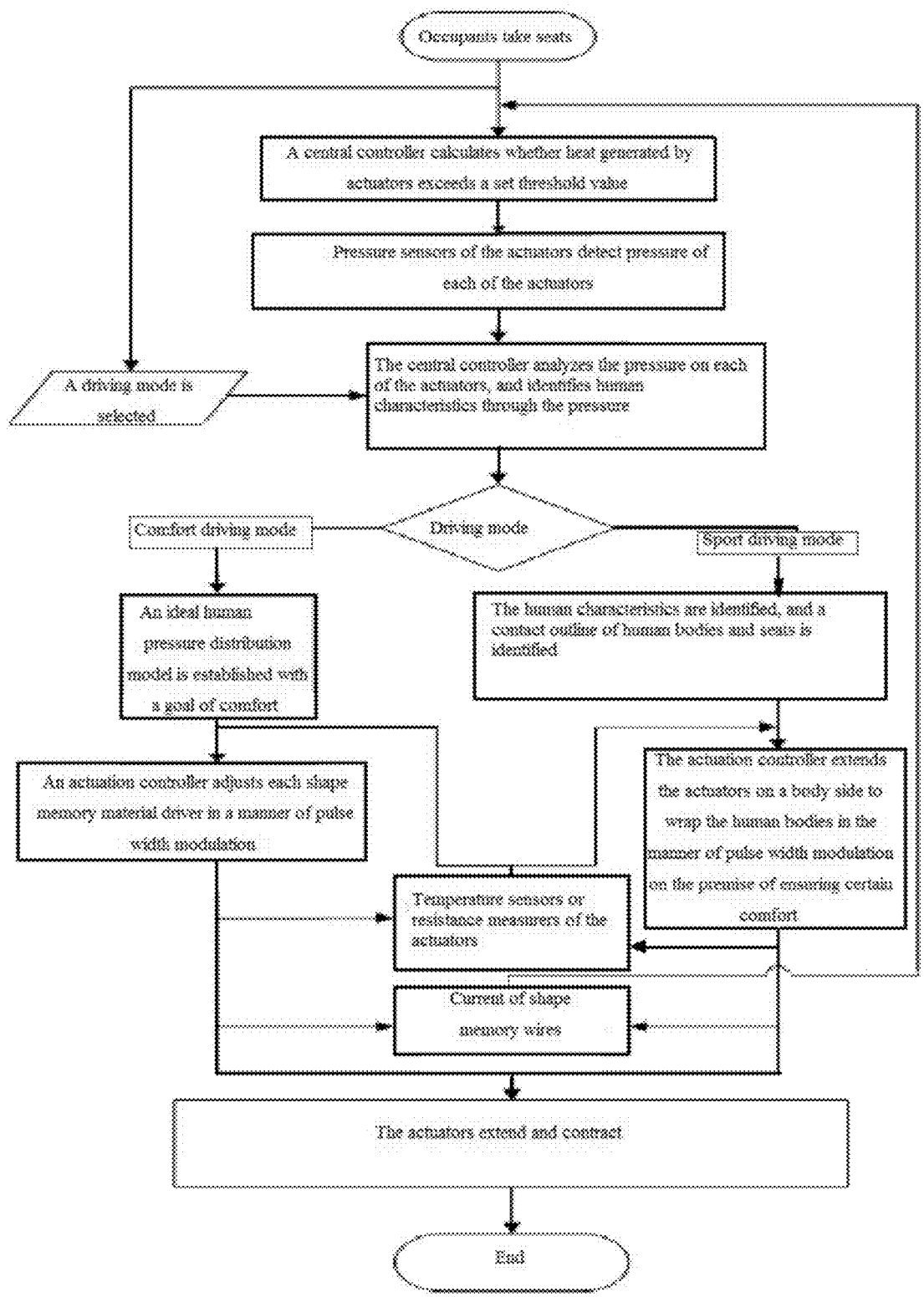
FIG. 13 is a flow chart of a working process of an array type automobile seat profile adaptive-adjusting apparatus according to the present invention.

As shown in FIG. 13, the working process of the present invention is as follows:

When the occupants take seats, the pressure is generated on the shape memory material actuators 130; the pressure sensors are mounted on the shape memory material actuators 130; after the pressure is sensed by the pressure sensors, a measurement pressure matrix A of m rows×n columns is generated; and specific data of m and n are determined by the number of specific shape memory material actuators 130 mounted in the actually manufactured seats. The rows and the columns of the measurement pressure matrix A correspond to the rows and the columns of the shape memory material actuators 130 on the automobile seats; and each element value of the measurement pressure matrix A is the pressure on the corresponding shape memory material actuator 130, i.e., an element $a_{ij}$ in the measurement pressure matrix A is a pressure value on the shape memory material actuator located in row i, column j. The shape memory material actuators 130 with the pressure greater than or equal to the set value are defined as valid actuators, i.e., a portion in actual contact with a driver; and the shape memory material actuators 130 with the pressure less than the set value are defined as invalid actuators. Generally, the actuators with the pressure value greater than 0N are defined as the valid actuators; and the actuators with the pressure value less than or equal to 0N are defined as the invalid actuators. Apparently, a boundary of the valid actuators and the invalid actuators is a contact outline of the human bodies and the seats. The set value can be calibrated as the boundary for distinguishing the valid actuators from the invalid actuators after measurement by test.

Multiple groups of ideal human pressure distribution matrixes $B_1$, $B_2$ and the like are prestored in a central controller. When the automobile seats are designed, data in the ideal human pressure distribution matrixes are used for measuring human pressure distribution when a large number of occupants subjectively feel comfortable during riding; and the pressure data are converted into an m×n matrix type.

The data of the measurement pressure matrix A inputted into the central controller are compared with the data of the multiple groups of ideal human pressure distribution matrixes $B_1$, $B_2$ and the like; and the pressure differences of corresponding points in the two types of data are calculated to obtain multiple groups of m×n matrixes, defined as deviation matrixes $C_1$, $C_2$ and the like.

Variances of the data in the deviation matrixes $C_1$, $C_2$ and the like are calculated; and a prestored pressure matrix $B_n$ corresponding to a deviation matrix $C_n$ with the minimum variance is used as an ideal matrix. The pressure data of the ideal matrix $B_n$ is outputted to an actuation controller to prepare for controlling extension and contraction of the actuators. After the occupants select a driving mode, the central controller combines the above obtained human characteristics to model and identify the human pressure distribution or the contact outline of the human bodies and the seats in two modes.

After the occupants take seats, a group of pressure distribution data A after the occupants take seats is obtained, as shown in Table 1.

TABLE 1

| Table 1A | Table 1B |
|---|---|
| Table 1C | Table 1D |

TABLE 1A

| | | | | | | | | |
|---|---|---|---|---|---|---|---|---|
| 0 | 0 | 0 | 0 | 0 | 1.07756052 | 2.002116981 | 3.800122411 | 3.973049777 |
| 0 | 0 | 0 | 0 | 2.055418295 | 3.644046277 | 6.153098171 | 8.199313126 | 9.812765193 |
| 0 | 0 | 0 | 1.01514539 | 2.930965857 | 5.518034341 | 9.394675068 | 10.45648485 | 16.39501592 |
| 0 | 0 | 0 | 3.205406821 | 5.265698126 | 8.239652457 | 9.952608339 | 14.99451095 | 21.06113947 |

TABLE 1A-continued

| | | | | | | | | |
|---|---|---|---|---|---|---|---|---|
| 0 | 0 | 2.738122736 | 2.999835584 | 8.244665091 | 10.52814178 | 15.22479751 | 21.39931318 | 22.3279478 |
| 0 | 0 | 2.92410572 | 6.914634843 | 9.762978131 | 16.46387682 | 18.18613786 | 19.70185646 | 24.91325512 |
| 0 | 0 | 4.666251535 | 9.298114166 | 12.48004832 | 16.65116925 | 20.67463183 | 20.34623266 | 23.97807556 |
| 0 | 1.023660356 | 5.677533694 | 9.056558902 | 17.4245024 | 18.48501327 | 21.85803075 | 20.71283594 | 23.33006189 |
| 0 | 1.953208042 | 7.283533813 | 12.61600749 | 21.67570615 | 22.7754124 | 21.70861434 | 24.19535451 | 26.06038742 |
| 0 | 3.294716249 | 9.72316137 | 15.88831871 | 19.82506725 | 22.42848759 | 22.82537021 | 27.18446845 | 26.86004219 |
| 0 | 4.786827285 | 10.5865834 | 16.29808902 | 20.7584872 | 26.81729246 | 30.37415548 | 30.06380163 | 32.37311035 |
| 0 | 6.247429716 | 10.72063151 | 16.61474429 | 21.79841761 | 23.95988375 | 28.19120004 | 30.28833846 | 31.05884226 |
| 0 | 6.042247077 | 11.73052035 | 18.5253482 | 25.04829724 | 27.80084994 | 32.1208567 | 33.67417518 | 33.81043606 |
| 1.034204404 | 7.509137662 | 15.76150367 | 22.38135373 | 23.59559476 | 31.03590309 | 34.04762326 | 36.02844358 | 38.26763357 |
| 5.140209846 | 5.347742492 | 3.006917455 | 1.028489853 | 0 | 0 | 0 | 0 | 0 |
| 7.424455605 | 5.78892717 | 3.107078181 | 2.006796376 | 0.957303691 | 0 | 0 | 0 | 0 |
| 17.08247072 | 19.10524959 | 15.19724294 | 9.491084289 | 4.577390047 | 0 | 0 | 0 | 0 |
| 20.08213782 | 23.61158124 | 24.89229323 | 20.6524883 | 21.60228916 | 9.407631354 | 0 | 0 | 0 |
| 21.91048227 | 25.01005108 | 24.10256422 | 22.03617878 | 23.52506617 | 16.37614079 | 4.936551898 | 0 | 0 |
| 22.09305773 | 24.90558499 | 25.50789899 | 23.36851999 | 22.52021297 | 20.84732983 | 10.87372742 | 0 | 0 |
| 24.91859512 | 24.10473931 | 28.14839426 | 22.53896455 | 21.47839022 | 18.66762637 | 14.28626689 | 10.72792982 | 0 |
| 24.59442231 | 27.17090187 | 29.02209977 | 26.53404686 | 22.68008064 | 19.77110869 | 16.2231856 | 11.45903624 | 9.058315848 |
| 27.33521844 | 30.08988616 | 29.41236074 | 24.89427372 | 22.61460343 | 21.55857299 | 17.49439096 | 13.88442624 | 9.506704684 |
| 31.24323767 | 27.32723804 | 27.59453405 | 26.92545906 | 26.14381742 | 23.89185556 | 18.10735452 | 15.54056783 | 12.79867284 |
| 32.4756796 | 34.00272527 | 33.0727909 | 33.56444446 | 29.43884207 | 25.00211962 | 21.46609596 | 20.50368513 | 21332 |
| 34.44370466 | 36.50244779 | 33.19292405 | 37.37544494 | 35.98192922 | 31.78414143 | 31.96208945 | 25.74811494 | 21.71847106 |
| 34.56617669 | 43.23425993 | 40.36209502 | 35.24199621 | 36.80149814 | 33.15724111 | 27.60209804 | 26.0563586 | 23.72262096 |
| 41.05674405 | 46.6846685 | 47.73683027 | 45.12814255 | 46.88216312 | 44.47021969 | 36.36708005 | 30.78599748 | 25.9258271 |

TABLE 1B

| 0 | 0 | 0 | 0 | 1.0023 | 1.8130 | 4.1001 | 5.5548 | 8.5158 | 7.2233 | 4.8371 | 3.0751 | 1.0044 | 0 | 0 | 0 | 0 | 0 |
|---|---|---|---|---|---|---|---|---|---|---|---|---|---|---|---|---|---|
| 0 | 0 | 0 | 0 | 16449 | 4618 | 32317 | 15652 | 42892 | 67043 | 43314 | 45559 | 70069 | 0 | 0 | 0 | 0 | 0 |
| 0 | 0 | 0 | 0.3724 | 1.0125 | 4.4367 | 7.2785 | 9.8027 | 9.6964 | 8.6305 | 8.1349 | 5.8720 | 2.4952 | 0.9569 | 0 | 0 | 0 | 0 |
| 0 | 0 | 0 | 15893 | 05431 | 68289 | 79494 | 03317 | 69158 | 91346 | 19969 | 39825 | 16517 | 02138 | 0 | 0 | 0 | 0 |
| 0 | 0 | 7.5599 | 0 | 11.406 | 16.334 | 17.426 | 17.236 | 12.130 | 11.990 | 9.9379 | 7.2122 | 4.5886 | 2.1322 | 0 | 0 | 0 | 0 |
| 0 | 0 | 74009 | 92998 | 54628 | 14421 | 30195 | 51792 | 22355 | 81048 | 0421 | 78935 | 23895 | 0 | 0 | 0 | 0 | 0 |
| 0 | 0 | 10.100 | 4.6948 | 18.369 | 24.093 | 25.155 | 23.069 | 19.923 | 20.777 | 13.761 | 11.099 | 7.6013 | 5.3183 | 2.7536 | 0 | 0 | 0 |
| 0 | 0 | 93367 | 14.782 | 58638 | 24.107 | 25 | 24.861 | 25.094 | 20.709 | 7951 | 59913 | 62613 | 59882 | 62179 | 0 | 0 | 0 |
| 0 | 0 | 07006 | 23.639 | 51011 | 23156 | 26.942 | 16198 | 70092 | 14499 | 21.314 | 11.099 | 9.8951 | 8.7010 | 3.1387 | 0 | 0 | 0 |
| 0 | 0 | 10.659 | 18.609 | 25.037 | 2.966 | 83261 | 26.288 | 24.865 | 94872 | 8697 | 15.027 | 15.413 | 9.0006 | 3.0499 | 0 | 0 | 0 |
| 0 | 0 | 52332 | 34745 | 51425 | 2239 | 23818 | 23.127 | 39542 | 23.251 | 33112 | 18.987 | 71046 | 7.5653 | 34935 | 0 | 0 | 0 |
| 0 | 9.2859 | 14.514 | 18.990 | 21.144 | 24.416 | 24.620 | 60812 | 26.802 | 9067 | 96778 | 33.570 | 18.269 | 52193 | 55149 | 0 | 0 | 0 |
| 9.2731 | 57607 | 14.514 | 18.990 | 21.144 | 24.416 | 24.620 | 30178 | 26.802 | 25.820 | 20.976 | 19.090 | 18.754 | 13.365 | 9.9044 | 4.7605 | 0 | 0 |
| 98323 | 22458 | 18401 | 33349 | 24.591 | 27.999 | 24.620 | 28.362 | 27.195 | 25.289 | 23.024 | 66015 | 00305 | 01198 | 63574 | 48082 | 1.0653 | 0 |
| 9.9822 | 12.717 | 16.547 | 19.789 | 23.775 | 15163 | 29.902 | 11248 | 81057 | 25.820 | 25.159 | 23.503 | 20.871 | 16.226 | 9.1413 | 5.5017 | 75198 | 0 |
| 27497 | 40829 | 57296 | 47517 | 24.883 | 23.775 | 08048 | 46758 | 27.195 | 6244 | 25.159 | 61088 | 95528 | 48049 | 75353 | 86952 | 1.9203 | 0 |
| 13.715 | 14.118 | 16.388 | 21.137 | 21983 | 08805 | 26.975 | 29.069 | 29.009 | 28845 | 6244 | 24.355 | 23.901 | 18.425 | 11.379 | 7.6770 | 82697 | 0 |
| 68306 | 64522 | 51875 | 21.360 | 24.883 | 30.290 | 91616 | 49069 | 0862 | 60392 | 62585 | 5996 | 65743 | 68443 | 0657 | 12562 | 2.9303 | 0 |
| 19.909 | 15.316 | 20.937 | 46499 | 22.556 | 30.290 | 27.914 | 31.688 | 31.421 | 30.211 | 25.919 | 21.831 | 21.124 | 18.427 | 15.695 | 9.7508 | 30694 | 0 |
| 93684 | 23627 | 24.997 | 7057 | 30.142 | 64911 | 1982 | 58196 | 05774 | 44444 | 68098 | 24.081 | 25568 | 17765 | 59518 | 32846 | 5.1507 | 0 |
| 21.919 | 22660 | 32.659 | 30.584 | 30.142 | 34.525 | 31.223 | 31.898 | 31.394 | 34.187 | 29.467 | 24.081 | 27.267 | 20.441 | 15.437 | 9.9410 | 48947 | 0 |
| 62059 | 17856 | 33.366 | 06591 | 33.992 | 18685 | 06983 | 00213 | 16503 | 80271 | 10934 | 60249 | 69986 | 85798 | 67149 | 36385 | 6.3808 | 0 |
| 25.537 | 27.964 | 32.659 | 33.498 | 33.218 | 34.289 | 37.137 | 36.471 | 38.776 | 31.489 | 29.366 | 29.87 | 30.645 | 20.854 | 17.728 | 10.492 | 44629 | 0 |
| 34813 | 07529 | 42308 | 33.498 | 27881 | 62013 | 26849 | 94592 | 45057 | 82544 | 23296 | 14881 | 44033 | 27388 | 28195 | 82862 | 6.3195 | 0 |
| 30.626 | 26.620 | 27.780 | 33.498 | 33.218 | 37.925 | 40.503 | 36.115 | 41.192 | 34.699 | 29.366 | 30.645 | 32.822 | 22.292 | 19.152 | 11.578 | 19463 | 0 |
| 91497 | 28791 | 1894 | 1894 | 98838 | 14801 | 58705 | 65398 | 3252 | 34.699 | 32.865 | 33.570 | 97829 | 24493 | 81733 | 53505 | 7.7986 | 0.9495 |
| | 08548 | 48342 | 39.012 | 44.283 | 45.608 | 44.084 | 43.910 | 41.760 | 38.159 | 41.643 | 36.946 | 30.582 | 23.748 | 22.906 | 15.816 | 80892 | 37142 |
| | | 74409 | 40.232 | 99763 | 37558 | 82439 | 09795 | 55193 | 84661 | 03424 | 30694 | 03999 | 09918 | 07692 | 51632 | | |

TABLE 1C

| | | | | | | | | |
|---|---|---|---|---|---|---|---|---|
| 2.183858079 | 9.340983182 | 15.36558929 | 21.36710633 | 29.0649751 | 31.03706087 | 34.42016513 | 42.52193956 | 47.93745671 |
| 0 | 4.550455003 | 9.788186362 | 20.66095381 | 25.31130237 | 36.50590335 | 37.19686879 | 42.13503136 | 48.86201344 |
| 0 | 1.873773646 | 10.69041152 | 21.8405599 | 29.0505893 | 35.70786979 | 35.89593548 | 69.58671505 | 46.89410124 |
| 0 | 1.818263329 | 11.0132491 | 22.86109515 | 30.54295919 | 30.50015383 | 32.88456945 | 35.1062347 | 43.76196449 |
| 0 | 1.0770083 | 9.683354007 | 18.45079797 | 26.15113999 | 28.80147882 | 39.10180606 | 42.42708069 | 49.4858411 |
| 0 | 0 | 2.019468238 | 10.2965749 | 20.47522562 | 27.89678239 | 34.90717448 | 42.5917671 | 43.89963845 |
| 0 | 0 | 0.992109492 | 8.965447293 | 18.82148042 | 27.6882395 | 29.78878808 | 37.46533455 | 37.20069262 |
| 0 | 0 | 0 | 0 | 6.314227644 | 21.48970008 | 23.15626276 | 29.80351053 | 38.20935163 |
| 0 | 0 | 0 | 0 | 0 | 5.101251144 | 21.54556588 | 27.35349487 | 30.1827543 |
| 0 | 0 | 0 | 0 | 0 | 2.892713072 | 10.34911485 | 19.22847845 | 20.12598068 |
| 0 | 0 | 0 | 0 | 0 | 0 | 2.134063855 | 8.241386771 | 12.510734345 |
| 0 | 0 | 0 | 0 | 0 | 0 | 0 | 0.947519778 | 8.632273248 |
| 0 | 0 | 0 | 0 | 0 | 0 | 0 | 0 | 0 |
| 0 | 0 | 0 | 0 | 0 | 0 | 0 | 0 | 0 |

| | | | | | | | | |
|---|---|---|---|---|---|---|---|---|
| 45.49608974 | 54.83036222 | 49.26262008 | 54.4145154 | 51.36761275 | 46.52834142 | 42.71824444 | 38.53099853 | 29.70368443 |
| 45.29258487 | 53.9031236 | 58.05317141 | 54.22156483 | 52.6926863 | 52.00064041 | 51.60732145 | 43.67289482 | 33.1029494 |
| 52.02310918 | 58.74700169 | 56.8289943 | 64.06970166 | 66.79508946 | 52.39723599 | 51.19174273 | 47.9872703 | 35.3503315 |
| 40.56871999 | 49.68813781 | 64.79959938 | 78.94789202 | 75.36049275 | 73.75336521 | 61.91395497 | 52.38608517 | 33.98942888 |
| 51.1092068 | 55.49744563 | 57.68452649 | 71.77050302 | 78.72490131 | 92.71983142 | 63.18205774 | 56.86072143 | 32.75124843 |
| 49.08089537 | 51.47014533 | 54.73261375 | 65.53785239 | 80.3282542 | 69.86939353 | 62.61681428 | 54.1167438 | 33.69682652 |
| 43.69030941 | 54.42529399 | 51.91418259 | 53.6269974 | 67.0277381 | 63.66988211 | 54.7805307 | 50.76451321 | 34.96309194 |
| 41.21967779 | 54.62958775 | 48.57802913 | 57.91164329 | 57.84985678 | 54.05611578 | 46.24175365 | 53.07378821 | 34.89015185 |
| 36.63410587 | 42.28571551 | 54.50395335 | 51.18247952 | 51.87337377 | 54.53869477 | 51.02256019 | 49.48769339 | 30.65056316 |
| 23.001836062 | 34.85729977 | 34.32441702 | 40.05276553 | 44.87164694 | 49.86560022 | 52.16307637 | 49.47970124 | 31.98635527 |
| 20.14225958 | 25.4095972 | 24.91920954 | 33.33157809 | 43.46447889 | 43.17463206 | 40.11788947 | 37.81661048 | 34.03798154 |
| 16.79353287 | 22.96356859 | 27.07445968 | 28.08310138 | 30.61722937 | 31.05672049 | 32.90409446 | 27.91339714 | 30.57076976 |
| 6.460126443 | 12.9139189 | 18.86490932 | 23.8210626 | 29.26495304 | 31.97038169 | 30.70715689 | 25.33993247 | 25.18212304 |
| 0 | 0 | 0 | 0 | 0 | 0 | 0 | 0 | 0 |

TABLE 1D

| | | | | | | | | |
|---|---|---|---|---|---|---|---|---|
| 31.68432619 | 38.35167019 | 41.52379825 | 51.04178746 | 55.78624689 | 59.33963074 | 54.29643284 | 46.34702029 | 43.90455309 |
| 33.46571449 | 36.21488307 | 54.64850707 | 54.49571355 | 55.8325458 | 52.798657 | 57.37495949 | 52.4754851 | 52.67398735 |
| 34.75329407 | 44.09574876 | 52.28462261 | 50.9021352 | 63.63579744 | 54.04630991 | 55.45648 | 55.79502423 | 45.84952216 |
| 35.74474947 | 52.97884972 | 55.01475841 | 70.94592636 | 76.45126406 | 77.48037304 | 58.9472779 | 52.92023282 | 47.05887672 |
| 38.47154628 | 65.66367309 | 73.03346978 | 82.74007291 | 90.77721919 | 66.29170289 | 58.34646856 | 54.11710271 | 49.47889644 |
| 36.89109795 | 56.00411191 | 60.08144855 | 71.10004249 | 78.8293593 | 66.42810471 | 63.37670426 | 55.35790199 | 51.51248663 |
| 37.25489432 | 51.23922644 | 54.0745827 | 65.32330724 | 63.63211749 | 59.63463761 | 50.99035866 | 57.51246656 | 42.95941721 |
| 30.43497232 | 53.2541546 | 53.58594624 | 55.18172362 | 62.93491038 | 54.77157909 | 57.26193685 | 53.99081838 | 40.25159393 |
| 31.33489242 | 43.53621682 | 55.49446058 | 48.95778716 | 52.4720401 | 56.45158061 | 47.89636086 | 42.37660055 | 39.01688652 |
| 31.94918817 | 45.13036975 | 47.53716352 | 55.38022556 | 48.02784721 | 45.22298517 | 37.99664024 | 37.80786765 | 22.57048002 |

TABLE 1D-continued

| | | | | | | | | |
|---|---|---|---|---|---|---|---|---|
| 30.45180556 | 33.24768129 | 37.25474512 | 43.39985801 | 40.43403674 | 35.93946152 | 28.5313881 | 21.8487682 | 19.88148534 |
| 27.22179733 | 29.88538105 | 29.6109914 | 29.14984152 | 29.66319214 | 29.34477203 | 31.06237238 | 26.54301259 | 19.3907735 |
| 27.37190662 | 29.05653129 | 26.08314322 | 28.5599347 | 27.54230473 | 24.3860723 | 18.59924692 | 11.60377099 | 5.536834123 |
| 0 | 0 | 0 | 0 | 0 | 0 | 0 | 0 | 0 |
| 39.85433818 | 37.44438603 | 38.68496108 | 31.28549899 | 26.3901473 | 18.83562297 | 13.56389887 | 8.44175246 | 1.974910501 |
| 41.48358107 | 41.18312993 | 41.20789438 | 31.0780071 | 27.55781487 | 18.46532838 | 10.75997238 | 5.146501755 | 0 |
| 45.86806568 | 38.36937459 | 38.21815115 | 32.64028026 | 30.84046373 | 20.58488027 | 11.65597441 | 1.801442122 | 0 |
| 40.8723946 | 36.72458597 | 36.98370264 | 32.94397791 | 30.66780724 | 19.35532658 | 11.57799657 | 1.913155162 | 0 |
| 48.77031089 | 43.40185933 | 37.25960137 | 29.29094319 | 25.75796989 | 21.9339877 | 10.33808883 | 1.027720119 | 0 |
| 41.86859555 | 37.72711314 | 34.28908083 | 29.12683857 | 21.37592944 | 9.496688077 | 1.918517545 | 0 | 0 |
| 38.40917562 | 31.50706215 | 31.02274597 | 26.86566307 | 19.91377984 | 9.191440296 | 1.085990409 | 0 | 0 |
| 34.96902135 | 32.43963746 | 24.70267236 | 18.63271852 | 7.456542728 | 0 | 0 | 0 | 0 |
| 28.54897814 | 25.90020973 | 18.53149578 | 4.562147052 | 0 | 0 | 0 | 0 | 0 |
| 23.0245592 | 18.0538265 | 9.878407496 | 3.121106087 | 0 | 0 | 0 | 0 | 0 |
| 12.00357795 | 9.039723986 | 2.019057097 | 0 | 0 | 0 | 0 | 0 | 0 |
| 8.393666501 | 0.920583716 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

The data A is a pressure matrix of 28*36; the central controller stores two groups of ideal pressure distributions $B_1$ and $B_2$, as shown in Table 2 and Table 3; and the data are all pressure matrixes of 28*36.

TABLE 2

| | |
|---|---|
| Table 2A | Table 2B |
| Table 2C | Table 2D |

TABLE 3

| | |
|---|---|
| Table 3A | Table 3B |
| Table 3C | Table 3D |

TABLE 2A

| | | | | | | | | |
|---|---|---|---|---|---|---|---|---|
| 0 | 0 | 0 | 0 | 0 | 0.98543871 | 2.081008109 | 3.828814618 | 3.629140412 |
| 0 | 0 | 0 | 0 | 2.05208205 | 3.734952223 | 6.547721469 | 8.318613695 | 8.687240232 |
| 0 | 0 | 0 | 1.092398753 | 2.838179498 | 6.302033509 | 8.900175893 | 10.59251589 | 16.41904087 |
| 0 | 0 | 0 | 3.024122423 | 5.079884973 | 7.789361347 | 10.08787523 | 14.82476717 | 19.4601305 |
| 0 | 0 | 2.941130039 | 2.718162098 | 8.165050113 | 10.88363559 | 13.67202044 | 19.78486245 | 21.16025832 |
| 0 | 0 | 3.079158479 | 7.274840249 | 10.19975819 | 13.55151762 | 20.51780194 | 20.85578212 | 21.25619697 |
| 0 | 0 | 5.485236639 | 10.03943232 | 12.86591249 | 19.18460127 | 22.24395208 | 21.02777242 | 25.99567538 |
| 0 | 1.004317935 | 6.071372887 | 9.118061111 | 16.32752446 | 19.4810457 | 22.84124186 | 23.80672646 | 23.17739103 |
| 0 | 1.836066401 | 8.693747065 | 12.93608696 | 20.05525934 | 22.17048467 | 23.25747774 | 28.09905554 | 26.09343662 |
| 0 | 3.242799888 | 9.396617771 | 14.49060673 | 19.63092065 | 23.69233512 | 27.23408334 | 29.20603985 | 30.2258874 |

TABLE 2A-continued

| | | | | | | | | |
|---|---|---|---|---|---|---|---|---|
| 0 | 5.384388939 | 9.968077034 | 16.08098407 | 19.35379335 | 26.13314766 | 28.11306578 | 31.48318166 | 31.99775218 |
| 0 | 5.9267876 | 11.3058684 | 16.61021511 | 21.82345277 | 22.97244282 | 30.54135294 | 29.51517134 | 34.78396005 |
| 0 | 6.338067136 | 11.8528011 | 18.28150631 | 22.77406067 | 32.26544361 | 30.1857312 | 36.32746488 | 37.61518396 |
| 1.01988765 | 7.437544037 | 14.09621025 | 19.85941575 | 25.25570168 | 27.08617286 | 32.94922364 | 37.05464532 | 42.6256822 |
| 4.614030035 | 5.058118051 | 3.252474065 | 0.926194817 | 0 | 0 | 0 | 0 | 0 |
| 7.414743491 | 5.420571855 | 2.998936758 | 2.133491579 | 1.064199296 | 0 | 0 | 0 | 0 |
| 18.42426211 | 17.16189861 | 14.33283337 | 10.60093675 | 5.13789762 | 0 | 0 | 0 | 0 |
| 20.10893951 | 24.16718594 | 25.7625998 | 23.8386724 | 18.06447921 | 10.78900133 | 0 | 0 | 0 |
| 21.01868327 | 25.91220636 | 27.08649402 | 22.25905756 | 23.74220036 | 14.24107254 | 5.356251116 | 0 | 0 |
| 22.25283547 | 25.09653136 | 25.04919727 | 24.02271512 | 23.07072526 | 19.24271606 | 10.16840245 | 0 | 0 |
| 26.4444566 | 24.53415067 | 28.46579572 | 24.5247924 | 23.20480092 | 19.63547563 | 14.62073635 | 9.137596342 | 0 |
| 22.96199229 | 29.36690554 | 26.30476208 | 24.30257524 | 23.48963416 | 20.83204358 | 15.10942255 | 11.24046767 | 8.637599005 |
| 26.53206524 | 26.63039375 | 24.90039891 | 25.37591806 | 24.1980066 | 19.5032779 | 16.98837882 | 13.6163889 | 9.676169588 |
| 27.51315789 | 30.19897944 | 28.78412576 | 28.59482042 | 26.77673436 | 23.63381709 | 20.08892977 | 17.6688305 | 15.0065443 |
| 30.3918266 | 37.09233312 | 32.31636233 | 30.17245274 | 29.29721069 | 26.5823042 | 24.66711357 | 23.21876879 | 19.36191324 |
| 38.58013987 | 35.28133177 | 35.42944092 | 35.13952579 | 30.25868464 | 30.7627746 | 31.44782393 | 27.01027846 | 22.26297793 |
| 39.50631822 | 38.00067696 | 38.49180286 | 40.61997499 | 35.59033843 | 28.99448975 | 26.50860787 | 27.58278224 | 26.04055457 |
| 45.53355656 | 49.39182175 | 47.78335717 | 44.90923646 | 41.55510826 | 43.07624437 | 42.77866749 | 30.66742278 | 29.99727627 |

TABLE 2B

| | | | | | | | | |
|---|---|---|---|---|---|---|---|---|
| 0 | 0 | 0 | 0 | 0.986659053 | 2.138521455 | 2.802999366 | 5.806798982 | 7.309393436 |
| 0 | 0 | 0 | 0 | 0.935047888 | 4.417257145 | 6.485660618 | 8.822195742 | 9.169941491 |
| 0 | 0 | 0.3639886 | 7.288550632 | 10.32504509 | 17.86326539 | 19.17101859 | 16.08633521 | 11.87768262 |
| 0 | 0 | 0 | 10.66271951 | 20.46568533 | 23.43574957 | 26.63901966 | 24.81348429 | 21.6031926 |
| 0 | 0 | 5.44316984 | 13.60450146 | 20.98364667 | 26.35777536 | 26.68503136 | 25.33613116 | 21.26755436 |
| 0 | 0 | 9.64294614 | 21.03135484 | 23.27451849 | 24.11494872 | 26.66674324 | 21.93296449 | 23.72647964 |
| 0 | 9.071181127 | 15.91940041 | 21.82844871 | 25.04600636 | 27.12718445 | 24.45932026 | 23.89392264 | 26.99469868 |
| 8.221289964 | 12.92696427 | 16.32447602 | 19.37148206 | 23.98656952 | 27.24291368 | 28.24873912 | 26.34859711 | 24.26819501 |
| 10.77678187 | 12.34204755 | 19.04263367 | 21.58062358 | 23.82441041 | 25.33715028 | 29.0246907 | 30.04216626 | 25.87299747 |
| 13.25286952 | 15.33031119 | 21.19674014 | 21.30922557 | 27.29690291 | 30.62515491 | 27.72600052 | 29.51976222 | 29.40084395 |
| 21.44638304 | 23.38564919 | 22.74782383 | 27.3555341 | 31.65200587 | 34.07679629 | 35.35191507 | 32.23116682 | 35.47521599 |
| 25.01632845 | 25.05869696 | 28.6991918 | 32.77444389 | 33.71099798 | 38.21726495 | 38.87838734 | 37.72264342 | 34.90973984 |
| 27.93862756 | 30.12725207 | 19.89004958 | 33.42777574 | 37.04641604 | 38.08296088 | 37.74292099 | 39.83523523 | 34.51859964 |
| 30.45281124 | 27.57226072 | 39.91724276 | 39.18647902 | 39.21291796 | 43.91616137 | 42.10820758 | 49.12678227 | 40.38835556 |
| 6.731180439 | 4.679369095 | 3.295553891 | 0.903584074 | 0 | 0 | 0 | 0 | 0 |
| 9.308095149 | 7.374977936 | 5.947012442 | 2.309837678 | 1.006350793 | 0 | 0 | 0 | 0 |
| 11.33532584 | 10.81031668 | 7.881665409 | 5.452125309 | 2.120249192 | 0 | 0 | 0 | 0 |
| 20.12419535 | 16.12905301 | 10.36907251 | 8.761366353 | 5.238823242 | 2.933515694 | 0 | 0 | 0 |

TABLE 2B-continued

| | | | | | | | | |
|---|---|---|---|---|---|---|---|---|
| 22.94647094 | 21.99917026 | 14.07974844 | 9.061829077 | 7.426660768 | 3.144004549 | 3.038561295 | 0 | 0 |
| 23.02212887 | 22.52986968 | 21.33101698 | 14.98164553 | 9.875788516 | 7.444688804 | 2.812429733 | 0 | 0 |
| 23.94239692 | 19.9622611 | 21.95187582 | 19.30579966 | 12.61098897 | 10.20068959 | 5.031689586 | 0 | 0 |
| 24.98919155 | 23.20553923 | 22.13088105 | 18.02292943 | 17.92259099 | 9.169994129 | 5.826039986 | 1.049532316 | 0 |
| 29.35426799 | 28.58760415 | 25.57958754 | 23.47078872 | 20.3496136 | 13.0136592 | 7.703653608 | 1.968160172 | 0 |
| 27.37997742 | 27.05944403 | 25.05937216 | 24.44251949 | 18.58322278 | 13.66079345 | 9.408134644 | 3.186790452 | 0 |
| 29.54972906 | 32.24107306 | 28.29098634 | 25.64486552 | 22.70238855 | 17.09188484 | 10.03154572 | 4.879605286 | 0 |
| 32.23488017 | 28.33537313 | 26.39439541 | 22.51119099 | 22.61685469 | 16.6278718 | 11.63941878 | 5.782881384 | 0 |
| 38.36832286 | 38.41277116 | 33.57961613 | 29.27834364 | 21.44952203 | 18.54454336 | 10.34988368 | 6.58326128 | 0 |
| 43.78187964 | 43.38170744 | 32.49934258 | 32.42643418 | 25.32955296 | 22.31389664 | 15.53431823 | 8.349089448 | 0.987826816 |

TABLE 2C

| | | | | | | | | |
|---|---|---|---|---|---|---|---|---|
| 2.120209106 | 9.215668669 | 14.68609882 | 20.60798868 | 28.64918331 | 31.64239734 | 39.03520582 | 36.86800666 | 39.85812462 |
| 0 | 4.760623679 | 10.9843506 | 18.2646405 | 29.12476041 | 31.82342117 | 43.31350257 | 38.4654034 | 46.25652073 |
| 0 | 1.978262485 | 10.78517356 | 19.10172552 | 32.23341302 | 36.89880102 | 39.09087479 | 37.1658568 | 40.78865562 |
| 0 | 2.137599805 | 12.38125555 | 20.083645 | 26.40271448 | 28.32271871 | 32.60963253 | 37.62932275 | 42.61713858 |
| 0 | 0.939240984 | 10.80269625 | 21.52026504 | 25.48627908 | 32.51899666 | 34.42365835 | 36.58689352 | 43.55987586 |
| 0 | 0 | 2.198152711 | 9.888660717 | 19.83856804 | 30.82290734 | 37.43537366 | 42.57860978 | 42.77368767 |
| 0 | 0 | 1.030632656 | 9.460645418 | 20.74242767 | 39.87736174 | 31.70912755 | 36.56032081 | 37.96855654 |
| 0 | 0 | 0 | 0 | 7.4060635 | 21.45848805 | 23.85415751 | 32.55514823 | 35.57043877 |
| 0 | 0 | 0 | 0 | 0 | 4.555952529 | 18.91124282 | 24.96319299 | 32.62606127 |
| 0 | 0 | 0 | 0 | 0 | 3.190113104 | 9.642046434 | 18.55757843 | 20.01026409 |
| 0 | 0 | 0 | 0 | 0 | 0 | 2.131824722 | 9.70222226 | 11.84034191 |
| 0 | 0 | 0 | 0 | 0 | 0 | 0 | 1.007705115 | 7.23298855 |
| 0 | 0 | 0 | 0 | 0 | 0 | 0 | 0 | 0 |
| 0 | 0 | 0 | 0 | 0 | 0 | 0 | 0 | 0 |
| 49.44509399 | 45.68582349 | 48.67384143 | 57.14360532 | 56.60134507 | 52.0004267 | 46.61892211 | 42.84617513 | 29.30588171 |
| 50.16270566 | 50.8736441 | 53.92297481 | 55.00792447 | 53.58895639 | 49.97382981 | 46.36651522 | 41.36637687 | 33.25242193 |
| 48.26388135 | 56.00741888 | 55.62409733 | 54.41732088 | 66.06986935 | 56.97895154 | 56.7990632 | 48.26648363 | 33.84416757 |
| 46.45598577 | 47.03299145 | 57.67796135 | 69.01677441 | 74.82429806 | 71.81355607 | 56.3980095 | 47.9881541 | 33.66263945 |
| 46.17565485 | 56.49471519 | 55.26673357 | 74.22018433 | 78.70183764 | 92.03167712 | 71.5027589 | 65.57001039 | 35.81004918 |
| 46.47817414 | 58.28207284 | 61.12593125 | 67.85102787 | 86.07813732 | 70.81991689 | 60.5165398 | 51.74507529 | 38.14794447 |
| 41.58183491 | 53.01803116 | 52.61000268 | 53.16646496 | 56.34658119 | 64.82128397 | 52.21803655 | 50.67684998 | 31.16778342 |
| 43.71433384 | 51.50812136 | 49.34534918 | 57.12661263 | 61.20329622 | 55.09859828 | 45.95766129 | 53.87860955 | 31.54687087 |
| 41.57483406 | 44.48602188 | 45.00658668 | 51.58843412 | 57.57150195 | 52.46778621 | 54.82344553 | 51.29231317 | 31.66084678 |
| 23.11930254 | 33.13361638 | 36.35532517 | 44.01162784 | 48.38428988 | 50.88767268 | 52.64787556 | 49.66894671 | 32.56045609 |
| 19.86964011 | 24.4840269 | 27.27437872 | 33.16328508 | 39.03871134 | 38.04769713 | 36.41591321 | 38.07302164 | 34.41685849 |
| 18.56409841 | 23.06231189 | 32.22541315 | 31.82712526 | 32.87794464 | 32.57501561 | 27.34087909 | 31.89261094 | 29.81460312 |

TABLE 2C-continued

| | | | | | | | | |
|---|---|---|---|---|---|---|---|---|
| 5.748222680 | 12.03783757 | 18.16901370 | 24.45779142 | 29.39396054 | 29.80054089 | 28.48018317 | 24.30733228 | 24.68709238 |
| 0 | 0 | 0 | 0 | 0 | 0 | 0 | 0 | 0 |

TABLE 2D

| | | | | | | | | |
|---|---|---|---|---|---|---|---|---|
| 27.83813567 | 38.82048081 | 49.25567013 | 50.82431429 | 50.54835086 | 54.74232149 | 52.7266807 | 54.34709238 | 43.93529121 |
| 31.32096093 | 40.74736454 | 52.4848991 | 52.16266128 | 60.35348048 | 60.6131659 | 58.68530212 | 56.36960044 | 52.40526589 |
| 36.17171468 | 48.81774373 | 53.71911619 | 50.51275577 | 65.37536348 | 54.17824627 | 57.64496462 | 57.29799877 | 49.56525127 |
| 34.98459938 | 51.67681764 | 57.58756996 | 64.24118802 | 79.6056688 | 67.0563914 | 58.96523927 | 52.4322057 | 46.51424384 |
| 38.85415041 | 64.86514165 | 66.58553693 | 85.84770783 | 88.07529244 | 69.60195027 | 60.03295517 | 59.39680761 | 51.99246076 |
| 34.87561284 | 52.29371211 | 64.63876553 | 66.89573828 | 78.67095608 | 70.60188373 | 55.50527952 | 50.21763785 | 50.71357212 |
| 30.69583291 | 46.39758759 | 55.40416966 | 58.07708597 | 60.51385012 | 52.89241598 | 50.95513858 | 51.26065842 | 47.18397875 |
| 33.81101027 | 52.51929508 | 54.22306998 | 53.61831563 | 55.61659059 | 58.80154548 | 56.92703887 | 45.04335073 | 43.0221114 |
| 30.27901032 | 45.52115322 | 47.82270794 | 50.44575494 | 53.71231788 | 57.13013422 | 51.02950181 | 44.75600307 | 39.23387322 |
| 32.17557736 | 47.38422577 | 53.59593453 | 49.97248581 | 44.39074396 | 38.72091389 | 36.21629312 | 35.05204764 | 26.87706806 |
| 33.43994855 | 27.50161843 | 33.50445466 | 41.58119655 | 39.77856852 | 32.58930255 | 28.96993393 | 23.35757969 | 19.87006808 |
| 30.64449475 | 27.50622283 | 32.39493861 | 28.22205862 | 29.00023612 | 28.68128054 | 27.34865675 | 23.63319859 | 16.7088097 |
| 25.44183223 | 29.54928147 | 30.2396388 | 30.99795893 | 32.85506882 | 25.23213304 | 19.83101554 | 12.0835961 | 5.481761348 |
| 0 | 0 | 0 | . | 0 | 0 | 0 | 0 | 0 |
| 48.13927277 | 40.51408736 | 33.68645411 | 34.19032099 | 29.33072714 | 18.97638366 | 13.65745663 | 8.843730045 | 1.810900088 |
| 43.37956044 | 40.43798884 | 41.46646332 | 33.17599729 | 29.58537055 | 21.53769064 | 10.60234472 | 4.598630237 | 0 |
| 47.34309012 | 38.70275652 | 37.80334014 | 34.89729203 | 31.11412282 | 20.85058718 | 11.39285101 | 2.09382365 | 0 |
| 40.6728228 | 38.63335337 | 32.09366036 | 29.40827104 | 28.80407185 | 20.48822344 | 13.07042147 | 2.054922516 | 0 |
| 44.1265642 | 36.10924453 | 36.30647157 | 32.45704366 | 25.70571772 | 18.99567844 | 9.183116286 | 0.914768375 | 0 |
| 40.0803227 | 38.99248154 | 35.90935561 | 32.89037264 | 20.27707268 | 9.50570749 | 2.163375348 | 0 | 0 |
| 39.96515375 | 37.95879654 | 30.33184575 | 31.02815571 | 18.04532852 | 9.48103847 | 1.001990607 | 0 | 0 |
| 36.0595784 | 30.27887789 | 23.13789531 | 19.13377674 | 6.747022228 | 0 | 0 | 0 | 0 |
| 31.46223687 | 24.86943435 | 18.67679333 | 5.182457664 | 0 | 0 | 0 | 0 | 0 |
| 21.12859526 | 17.9853435 | 9.001998836 | 2.914874719 | 0 | 0 | 0 | 0 | 0 |
| 11.93299103 | 8.656147946 | 1.967264988 | 0 | 0 | 0 | 0 | 0 | 0 |
| 8.521544772 | 1.090167512 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 3A

| | | | | | | | | |
|---|---|---|---|---|---|---|---|---|
| 0 | 0 | 0 | 0 | 0 | 1.033617186 | 2.139679483 | 4.311923385 | 3.829156693 |
| 0 | 0 | 0 | 0 | 2.123965521 | 3.743062234 | 5.868516995 | 8.002263344 | 9.336832407 |
| 0 | 0 | 0 | 0.923661582 | 2.812055727 | 6.060594426 | 9.429077721 | 9.553990478 | 13.92344947 |
| 0 | 0 | 0 | 2.723413786 | 4.747199857 | 8.735800126 | 12.04816483 | 15.10187454 | 20.0483466 |
| 0 | 0 | 2.98950397 | 3.058916715 | 7.286702146 | 10.19204334 | 15.06989717 | 20.29699822 | 22.97383848 |
| 0 | 0 | 2.965643987 | 7.146038908 | 10.21792291 | 15.92571213 | 19.71966121 | 20.63377849 | 24.97268762 |

TABLE 3A-continued

| | | | | | | | | |
|---|---|---|---|---|---|---|---|---|
| 0 | 0 | 4.811754952 | 10.03286482 | 13.72080432 | 19.74431648 | 19.77006395 | 19.86496012 | 25.11409848 |
| 0 | 0.987386556 | 5.466376526 | 9.015014808 | 18.03983072 | 20.4665129 | 21.22296607 | 23.9327181 | 26.2492401 |
| 0 | 1.921719388 | 8.406066837 | 12.45344007 | 18.11100035 | 20.74088281 | 22.13217705 | 26.03508519 | 26.49952586 |
| 0 | 2.874516198 | 8.337505464 | 16.33806113 | 21.96154113 | 20.85929828 | 24.37605027 | 26.35883693 | 26.5411535 |
| 0 | 4.742516309 | 9.711844238 | 18.27002395 | 21.00394768 | 24.75561896 | 27.04746228 | 27.38958921 | 32.13344304 |
| 0 | 6.524020332 | 10.77091612 | 16.60779523 | 21.26078894 | 22.56897278 | 27.11578896 | 30.12319576 | 32.08972605 |
| 0 | 6.432228289 | 11.8481467 | 18.4473635 | 21.49986244 | 29.84226449 | 35.09298442 | 33.1397587 | 39.53367049 |
| 0.922009699 | 7.835565217 | 13.56371865 | 19.91613469 | 25.62818197 | 32.70718254 | 35.2217972 | 37.62803242 | 42.33604985 |
| 5.46854594 | 5.320750251 | 3.226996619 | 0.925002876 | 0 | 0 | 0 | 0 | 0 |
| 6.438258837 | 5.997097157 | 2.736570133 | 1.955342267 | 1.008303605 | 0 | 0 | 0 | 0 |
| 18.16911751 | 16.4745824 | 14.82262941 | 10.63537549 | 4.781660343 | 0 | 0 | 0 | 0 |
| 21.5730676 | 23.9598869 | 22.92129001 | 24.1171731 | 19.92360135 | 10.2306588 | 0 | 0 | 0 |
| 21.19238471 | 22.72764693 | 25.31618808 | 25.73755121 | 22.81340064 | 13.8678717 | 4.92425327 | 0 | 0 |
| 25.07599762 | 23.51469868 | 25.1965529 | 22.00234023 | 21.65798859 | 18.49517411 | 9.979967346 | 0 | 0 |
| 25.56841174 | 23.84062213 | 27.39390108 | 24.18855995 | 23.49754055 | 19.13783597 | 15.25051341 | 10.59350284 | 0 |
| 26.41484096 | 28.79557191 | 26.50530552 | 24.62787167 | 22.20041039 | 20.94293123 | 14.66646319 | 11.07316123 | 9.88801785 |
| 28.37307526 | 30.77409334 | 27.47175341 | 24.08902694 | 24.75189713 | 20.62749403 | 18.57655667 | 12.11294318 | 9.187249056 |
| 30.80565112 | 30.8985059 | 29.7538432 | 30.71291107 | 23.16697307 | 23.44752033 | 18.20922088 | 16.5098156 | 14.42173192 |
| 33.50672068 | 35.38687925 | 35.38247804 | 32.3088057 | 27.61444674 | 31.52366187 | 25.28415267 | 23.53013768 | 18.8607061 |
| 39.1970102 | 40.19904366 | 37.15801988 | 36.74475882 | 36.03017156 | 30.37421328 | 31.27215149 | 27.44701846 | 22.77059089 |
| 40.82303633 | 41.50122038 | 38.83103333 | 39.52970284 | 31.6397336 | 29.13415283 | 28.92988163 | 28.48259493 | 25.16637659 |
| 43.56613921 | 46.12202066 | 44.59411394 | 42.00200736 | 40.0118275 | 41.58372604 | 40.94080517 | 32.55502793 | 26.30802911 |

TABLE 3B

| | | | | | | | | |
|---|---|---|---|---|---|---|---|---|
| 0 | 0 | 0 | 0 | 0.964912403 | 2.070076458 | 4.201423484 | 6.210396398 | 7.589824309 |
| 0 | 0 | 0 | 0 | 0.916716423 | 4.590921136 | 6.578788125 | 9.440203886 | 10.73745309 |
| 0 | 0 | 0.411605786 | 6.522478937 | 11.02786417 | 17.44671421 | 20.83517394 | 17.09496823 | 13.074388 |
| 0 | 0 | 0 | 10.62184157 | 21.3314593 | 21.40336602 | 26.04819351 | 23.07662297 | 23.82219474 |
| 0 | 0 | 5.01786091 | 14.92952326 | 23.78029939 | 22.42310917 | 23.37718073 | 22.32896977 | 25.18007881 |
| 0 | 0 | 9.491333277 | 18.46515013 | 24.0285412 | 25.41773553 | 26.79148696 | 23.42718852 | 24.4100446 |
| 0 | 9.575295022 | 14.39252452 | 21.50288245 | 22.46178079 | 24.96333456 | 28.12893971 | 26.60509701 | 23.09487691 |
| 9.653516962 | 11.00310393 | 16.4815171 | 20.54074552 | 22.07087846 | 25.24403884 | 30.58531325 | 25.22536765 | 27.13266294 |
| 9.843492965 | 13.21367147 | 19.4090159 | 19.30858167 | 23.88187352 | 26.375306 | 27.3812384 | 27.04786158 | 28.52394033 |
| 13.75167969 | 15.82043357 | 21.44442587 | 23.79713361 | 26.90228463 | 26.52610692 | 30.37727538 | 32.79883192 | 31.22496877 |
| 21.83656536 | 20.12161495 | 23.54957538 | 26.30309292 | 32.54728985 | 34.20693407 | 30.86596395 | 36.08278966 | 32.50154115 |
| 25.20117741 | 27.43504979 | 29.39456347 | 28.1464481 | 30.23626832 | 37.2156888 | 36.09848923 | 34.94419068 | 36.77225318 |
| 28.50118499 | 26.80728261 | 31.24972154 | 35.1268345 | 33.8821765 | 39.56208989 | 40.38777533 | 43.99818498 | 34.73780323 |
| 26.50768851 | 29.17152051 | 38.0522241 | 42.52668911 | 39.80307948 | 43.83168166 | 42.92055247 | 41.53002215 | 47.19552015 |

TABLE 3B-continued

| | | | | | | | | |
|---|---|---|---|---|---|---|---|---|
| 7.187989484 | 5.211556427 | 2.701273215 | 1.031623236 | 0 | 0 | 0 | 0 | 0 |
| 9.180820103 | 7.969493452 | 6.541328829 | 2.566991274 | 1.008521493 | 0 | 0 | 0 | 0 |
| 11.90021131 | 10.45836044 | 8.426078981 | 4.729306251 | 2.144539271 | 0 | 0 | 0 | 0 |
| 20.28334654 | 16.31267772 | 11.55286916 | 7.491564824 | 5.409139024 | 3.19734333 | 0 | 0 | 0 |
| 21.27584765 | 20.06901761 | 13.91659451 | 9.332705015 | 8.5525609 | 2.828765824 | 3.093349424 | 0 | 0 |
| 25.10284013 | 22.69288874 | 19.39727817 | 13.94882127 | 10.75774577 | 7.407456453 | 2.719401322 | 0 | 0 |
| 23.71163099 | 20.76004763 | 19.53563035 | 16.92989063 | 13.64007382 | 10.30937663 | 5.05706683 | 0 | 0 |
| 25.50771297 | 24.71680896 | 21.98557098 | 20.72884383 | 16.62296177 | 9.052292896 | 6.263761866 | 1.041088238 | 0 |
| 28.18941675 | 23.83000325 | 25.48153081 | 19.86999669 | 20.03608903 | 12.68586309 | 7.376652878 | 1.802011553 | 0 |
| 29.00115871 | 26.81317845 | 25.66434397 | 25.10456601 | 18.67532706 | 16.26768914 | 8.489965277 | 3.169509467 | 0 |
| 30.16165766 | 27.13157894 | 29.05504839 | 22.62846143 | 22.39066831 | 16.97386465 | 10.62204043 | 5.426859573 | 0 |
| 31.15503895 | 32.91133941 | 28.78159322 | 27.35555332 | 23.88324777 | 19.20244196 | 10.20505614 | 5.409954789 | 0 |
| 35.33114762 | 32.75446651 | 34.51352339 | 28.78557406 | 21.47962837 | 17.599144 | 11.84017824 | 6.389554011 | 0 |
| 44.01365077 | 37.32313797 | 37.51891996 | 30.15043848 | 26.9186866 | 22.09109058 | 16.27066819 | 8.427737389 | 0.937322405 |

TABLE 3C

| | | | | | | | | |
|---|---|---|---|---|---|---|---|---|
| 2.038818092 | 8.962954388 | 16.03224216 | 20.24133324 | 27.4057281 | 31.34308504 | 37.15630316 | 42.51023667 | 46.78287051 |
| 0 | 5.064996093 | 9.576141288 | 20.45090843 | 29.40551815 | 33.22767504 | 42.19447767 | 40.12616367 | 48.70367392 |
| 0 | 1.995847756 | 10.45075434 | 19.20323636 | 27.9211128 | 33.53374696 | 34.1899445 | 36.42860137 | 44.72194683 |
| 0 | 1.907924653 | 11.97211112 | 22.2521952 | 28.16936574 | 33.05149621 | 34.85306103 | 36.07538168 | 38.47619983 |
| 0 | 1.097948028 | 10.45807223 | 21.18256651 | 25.07733432 | 34.07773965 | 35.86520027 | 42.19995342 | 46.66821323 |
| 0 | 0 | 1.881046438 | 10.56218453 | 21.40243062 | 29.71799167 | 33.8423357 | 37.32238097 | 43.89481779 |
| 0 | 0 | 0.943255241 | 8.731977178 | 18.38390501 | 28.30724899 | 30.44769938 | 37.88553228 | 42.15947101 |
| 0 | 0 | 0 | 0 | 6.68527509 | 21.70347417 | 26.81968821 | 28.91523469 | 37.30706593 |
| 0 | 0 | 0 | 0 | 0 | 5.240843627 | 18.79425229 | 24.14889834 | 31.23650859 |
| 0 | 0 | 0 | 0 | 0 | 3.142579844 | 10.34490193 | 16.93524841 | 22.41948024 |
| 0 | 0 | 0 | 0 | 0 | 0 | 2.160732548 | 9.480986525 | 13.65747271 |
| 0 | 0 | 0 | 0 | 0 | 0 | 0 | 0.91399463 | 7.994755526 |
| 0 | 0 | 0 | 0 | 0 | 0 | 0 | 0 | 0 |
| 0 | 0 | 0 | 0 | 0 | 0 | 0 | 0 | 0 |
| 50.77270238 | 48.80847529 | 50.38941188 | 59.4340737 | 49.34885743 | 52.47669976 | 42.42399817 | 40.60062614 | 30.04100026 |
| 49.73030641 | 54.42654254 | 59.9778096 | 51.57739023 | 50.48526343 | 51.09458172 | 51.45658662 | 36.07981916 | 34.88485109 |
| 53.28801698 | 53.49551483 | 55.65913148 | 62.94111716 | 61.43486456 | 54.92227751 | 51.73480829 | 50.97002194 | 32.30440764 |
| 43.40233429 | 49.07619445 | 55.90087293 | 75.3029559 | 82.70233108 | 67.04746911 | 55.24455408 | 51.0880836 | 34.57436091 |
| 54.76146535 | 53.55569696 | 58.33556468 | 73.04457443 | 90.63212859 | 93.55550837 | 68.28516126 | 62.74691237 | 36.76706817 |
| 47.7821104 | 54.65238636 | 62.89954911 | 64.86804475 | 84.64376219 | 69.75227405 | 57.15432969 | 50.54546568 | 36.50250007 |
| 42.0700434 | 53.03618674 | 57.26490011 | 57.37115239 | 64.63761538 | 60.47995304 | 53.10239886 | 47.58096384 | 33.33044721 |
| 42.00978885 | 54.10535782 | 55.12945703 | 57.10017444 | 58.67665056 | 52.87583952 | 52.25382531 | 49.81009536 | 35.36736074 |
| 40.51703352 | 39.53402059 | 45.06225787 | 53.32319708 | 57.29446968 | 49.63620602 | 52.23844873 | 45.38247825 | 34.69110389 |

TABLE 3C-continued

| | | | | | | | | |
|---|---|---|---|---|---|---|---|---|
| 27.11169047 | 33.87022573 | 37.04502657 | 45.02162317 | 53.48898291 | 46.51368725 | 49.13237746 | 41.84714114 | 33.60536889 |
| 19.30809717 | 24.35580299 | 29.16807634 | 34.17298441 | 40.0462045 | 42.556071 | 34.91166106 | 32.6846927 | 30.62778691 |
| 19.09464935 | 24.9346622 | 28.91006897 | 31.83502955 | 28.83031869 | 31.62886983 | 32.1513217 | 28.55067785 | 31.78089473 |
| 6.0459004 | 11.42932557 | 20.38833169 | 23.1437172 | 31.7388671 | 28.17417439 | 30.02164622 | 25.36871431 | 23.21382915 |
| 0 | 0 | 0 | 0 | 0 | 0 | 0 | 0 | 0 |

TABLE 3D

| | | | | | | | | | |
|---|---|---|---|---|---|---|---|---|---|
| 27.57736057 | 41.79859755 | 49.20121444 | 48.76689193 | 50.38085829 | 53.71552485 | 52.93526621 | 49.25483118 | 49.36396239 | 44.52234219 |
| 31.26132608 | 42.86649343 | 51.19157353 | 53.04583708 | 59.22357688 | 60.04694918 | 55.38628994 | 51.98598441 | 46.04499668 | 45.67457549 |
| 33.00179884 | 46.53999059 | 49.45266513 | 57.89845247 | 58.23383372 | 59.56691031 | 54.50616305 | 53.90322172 | 52.00225074 | 44.37270811 |
| 34.47773991 | 54.61745605 | 63.91438835 | 64.59402211 | 73.94165848 | 73.01589437 | 61.47802695 | 46.11922644 | 44.06223896 | 42.19188736 |
| 39.4317475 | 68.71497005 | 72.17970342 | 89.88595569 | 85.74281489 | 72.73429532 | 54.31578472 | 54.16741851 | 45.84904751 | 46.38528379 |
| 34.94998627 | 49.88399619 | 60.55743101 | 72.81859282 | 77.03393197 | 76.45284182 | 57.82549154 | 56.24900471 | 47.14478868 | 41.26183417 |
| 33.32600349 | 52.68244859 | 53.21488797 | 59.50668991 | 60.53730735 | 58.53723056 | 55.36299488 | 58.17344963 | 43.68894986 | 37.28816724 |
| 36.26693573 | 51.1553188 | 46.30959512 | 56.92170186 | 62.4401633 | 58.55697294 | 51.16380162 | 47.19900779 | 37.8132251 | 34.52663779 |
| 30.47038725 | 52.02165588 | 49.22710429 | 52.26216985 | 58.73097427 | 53.75146039 | 51.02190441 | 40.77428105 | 39.54283337 | 30.03051651 |
| 33.05807815 | 46.9433428 | 48.61112936 | 47.64037922 | 50.76631658 | 45.58774204 | 36.95068873 | 33.36369315 | 26.27076293 | 21.45146204 |
| 34.97124234 | 36.4149676 | 37.98756726 | 39.19354723 | 39.33537606 | 35.40085276 | 25.02857144 | 22.99919056 | 20.18914654 | 12.94896779 |
| 31.02690622 | 31.46204973 | 32.91658858 | 32.51866317 | 30.85733885 | 28.01903551 | 32.48288102 | 23.44194771 | 18.19254031 | 7.747874244 |
| 23.99587428 | 26.37955229 | 26.36007722 | 28.35627262 | 28.28448871 | 21.52201553 | 20.56223535 | 10.8548631 | 6.15668735 | 0 |
| 0 | 0 | 0 | 0 | 0 | 0 | 0 | 0 | 0 | 0 |

| | | | | | | | |
|---|---|---|---|---|---|---|---|
| 37.45282774 | 37.93946981 | 35.3914388 | 26.39445963 | 21.70294472 | 13.53826669 | 9.894846412 | 1.994092183 |
| 42.56977982 | 37.44473098 | 36.69555334 | 27.34238898 | 21.3308303 | 9.754318506 | 4.727653072 | 0 |
| 37.71010815 | 37.54246844 | 31.88527178 | 28.62871754 | 19.03760464 | 10.26918572 | 2.167816882 | 0 |
| 35.50597596 | 31.71224986 | 31.99646126 | 31.13372223 | 19.79469142 | 12.09653471 | 2.056799722 | 0 |
| 42.14668118 | 40.00478284 | 34.823878 | 28.30411327 | 20.08925913 | 9.20332487 | 0.921064037 | 0 |
| 40.00920076 | 32.0413995 | 32.85424275 | 19.79149092 | 9.794714202 | 1.815707098 | 0 | 0 |
| 37.86625365 | 29.0312079 | 26.72602447 | 19.79662766 | 8.962397609 | 1.086645822 | 0 | 0 |
| 27.34711742 | 25.40308774 | 18.71559691 | 7.622063796 | 0 | 0 | 0 | 0 |
| 24.68375964 | 19.90094063 | 5.246551427 | 0 | 0 | 0 | 0 | 0 |
| 18.26011708 | 10.61064097 | 2.729681114 | 0 | 0 | 0 | 0 | 0 |
| 9.117120888 | 20.12311256 | 0 | 0 | 0 | 0 | 0 | 0 |
| 1.064763313 | 0 | 0 | 0 | 0 | 0 | 0 | 0 |

TABLE 3D-continued

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |

The deviation matrixes $C_1=B_1-A$ and $C_2=B_2-A$ are solved in the central controller; and results are shown in Table 4 and Table 5.

TABLE 4

| Table 4A | Table 4B |
|---|---|
| Table 4C | Table 4D |

TABLE 5

| Table 5A | Table 5B |
|---|---|
| Table 5C | Table 5D |

TABLE 4A

| | | | | | | | | | |
|---|---|---|---|---|---|---|---|---|---|
| 0 | 0 | 0 | 0 | 0 | 1.033617186 | 2.139679483 | 4.311923385 | 3.829156693 | 5.46854594 |
| 0 | 0 | 0 | 0 | 2.123965521 | 3.743062235 | 5.868516995 | 8.002263344 | 9.336832407 | 6.438258837 |
| 0 | 0 | 0 | 0.923661582 | 2.812055727 | 6.060594426 | 9.429077721 | 9.553990478 | 13.92344947 | 18.16911751 |
| 0 | 0 | 0 | 2.723413786 | 4.747199857 | 8.735800126 | 12.04816483 | 15.10187454 | 20.0483466 | 21.5730676 |
| 0 | 0 | 2.98950397 | 3.058916715 | 7.286702146 | 10.19204334 | 15.06989717 | 20.29699822 | 22.97383848 | 21.19238471 |
| 0 | 0 | 2.965643987 | 7.146038908 | 10.21792291 | 15.92571213 | 19.71966121 | 20.63377849 | 24.97268762 | 25.07599762 |
| 0 | 0 | 4.811754952 | 10.03286482 | 13.72080432 | 19.74431648 | 19.86406395 | 25.11496012 | 25.56909848 | 23.84041174 |
| 0 | 0.987386556 | 5.466376526 | 9.015014808 | 18.03983072 | 20.4665129 | 21.22296607 | 23.9327181 | 26.2492401 | 26.41484096 |
| 0 | 1.921719388 | 8.406066837 | 12.45344007 | 18.11100035 | 20.74088281 | 22.13217705 | 26.03508519 | 26.49952586 | 28.37307526 |
| 0 | 2.874516198 | 8.337505464 | 16.33806113 | 21.96154113 | 20.85929828 | 24.37605027 | 26.35883693 | 26.5411535 | 30.80565112 |
| 0 | 4.742516309 | 9.711844238 | 18.27002395 | 21.00394768 | 24.75561896 | 27.04746228 | 27.38958921 | 32.13344304 | 33.50672068 |
| 0 | 6.524020332 | 10.77091612 | 16.60779523 | 21.26078894 | 22.56897278 | 27.11578896 | 30.12319576 | 32.08972605 | 39.1970102 |
| 0 | 6.432228289 | 11.8481467 | 18.4473635 | 21.49986244 | 29.84226449 | 35.09298442 | 33.1397587 | 39.53367049 | 40.82303633 |
| 0.922009699 | 7.835565217 | 13.56371865 | 19.91613469 | 25.62818197 | 32.70718254 | 35.2217972 | 37.62803242 | 42.33604985 | 43.56613921 |

| | | | | | | | |
|---|---|---|---|---|---|---|---|
| 5.320750251 | 3.226996619 | 0.925002876 | 0 | 0 | 0 | 0 | 0 |
| 5.997097157 | 2.736570133 | 1.955342267 | 1.008303605 | 0 | 0 | 0 | 0 |
| 16.4745824 | 14.88262941 | 10.63537549 | 4.781660343 | 0 | 0 | 0 | 0 |
| 23.9598869 | 22.92129001 | 24.1171731 | 19.92360135 | 10.2306588 | 0 | 0 | 0 |
| 22.72764693 | 25.31618808 | 25.73755121 | 22.81340064 | 13.8678717 | 4.92425327 | 0 | 0 |
| 23.51469868 | 25.1965529 | 22.00234023 | 21.65798859 | 18.49517411 | 9.979967346 | 0 | 0 |
| 23.84062213 | 27.39390108 | 24.18855995 | 23.49754055 | 19.13783597 | 15.25051341 | 10.59350284 | 0 |
| 28.79557191 | 26.50530552 | 24.62787167 | 22.20041039 | 20.94293123 | 14.66646319 | 11.07316123 | 9.88801785 |
| 30.77409334 | 27.47175341 | 24.08902694 | 24.75189713 | 20.62749403 | 18.57655667 | 12.11294318 | 9.187249056 |
| 30.8985059 | 29.7538432 | 30.71291107 | 23.16697307 | 23.44752033 | 18.20922088 | 16.5098456 | 14.42173192 |
| 35.38687925 | 35.38247804 | 32.3088057 | 27.61444674 | 31.52366187 | 25.28415267 | 23.53013768 | 18.8607061 |
| 40.19904366 | 37.15801988 | 36.74475882 | 36.06017156 | 30.37421328 | 31.27215149 | 27.44701846 | 22.77059089 |

TABLE 4A-continued

| | | | | | | | |
|---|---|---|---|---|---|---|---|
| 41.50122038 | 38.83103333 | 39.52970284 | 31.6397336 | 29.13415283 | 28.92988163 | 28.48259493 | 25.16637659 |
| 46.12202066 | 44.59411394 | 42.00200736 | 40.0118275 | 41.58372604 | 40.94080517 | 32.55502793 | 26.30802911 |
| 5.3207 | 3.2269 | 0.9250 | 0 | 0 | 0 | 0 | 0 |

TABLE 4B

| | | | | | | | | |
|---|---|---|---|---|---|---|---|---|
| 0 | 0 | 0 | 0 | 0.964912403 | 2.070076458 | 4.201523484 | 6.210396398 | 7.589824309 |
| 0 | 0 | 0 | 0 | 0.916716423 | 4.590921136 | 6.578788125 | 9.440203886 | 10.73745309 |
| 0 | 0 | 0.411605786 | 6.522478937 | 11.02786417 | 17.44671421 | 20.83517394 | 17.09496823 | 13.074388 |
| 0 | 0 | 0 | 10.62184157 | 21.3314593 | 21.40336602 | 26.04819351 | 23.07662297 | 23.82219474 |
| 0 | 0 | 5.01786091 | 14.92952326 | 23.78029939 | 22.42310917 | 23.37718073 | 22.32896977 | 25.18007881 |
| 0 | 0 | 9.491333277 | 18.46515013 | 24.0285412 | 25.41773553 | 29.79148696 | 23.42718852 | 24.4100446 |
| 0 | 9.575295022 | 14.39252452 | 21.50288245 | 22.46178079 | 24.966333456 | 28.12893971 | 26.60509701 | 23.09487691 |
| 9.653516962 | 11.00310393 | 16.4815171 | 20.54074552 | 22.07087846 | 25.24403884 | 30.58532325 | 25.22536765 | 27.13266294 |
| 9.843492965 | 13.21367147 | 19.4090159 | 19.30858167 | 23.88187352 | 26.375306 | 27.3812384 | 27.04786158 | 28.52394033 |
| 13.75167969 | 15.82043357 | 21.44442587 | 23.79713361 | 26.90228463 | 26.52610692 | 30.37727538 | 32.79883192 | 31.22496877 |
| 21.836656536 | 20.12161495 | 23.54957538 | 26.30309292 | 32.54728985 | 34.20693407 | 30.86596395 | 36.08278966 | 32.50154115 |
| 25.20117741 | 27.43504979 | 29.39456347 | 28.1464481 | 30.23626832 | 37.2156888 | 36.09848923 | 34.94419068 | 36.77225318 |
| 28.50418499 | 26.80728261 | 31.24972154 | 35.1268345 | 33.8821765 | 39.56208989 | 40.38777533 | 43.99818498 | 34.73780323 |
| 26.50768851 | 29.17152051 | 38.0522241 | 42.52668911 | 39.80307948 | 43.83168166 | 42.92055247 | 41.53002215 | 47.18652015 |

| | | | | | | | | |
|---|---|---|---|---|---|---|---|---|
| 7.187989484 | 5.211556427 | 2.701273215 | 1.031623236 | 0 | 0 | 0 | 0 | 0 |
| 9.180820103 | 7.969493452 | 6.541328829 | 2.566991274 | 1.008521493 | 0 | 0 | 0 | 0 |
| 11.90021131 | 10.45836044 | 8.426078981 | 4.729306251 | 2.144539271 | 0 | 0 | 0 | 0 |
| 20.28334654 | 16.31267772 | 11.55286916 | 7.491564824 | 5.409139024 | 3.19734333 | 0 | 0 | 0 |
| 21.27594765 | 20.06901761 | 13.91659451 | 9.332705015 | 8.5525609 | 2.828765824 | 3.093349424 | 0 | 0 |
| 25.10284013 | 22.69288874 | 19.39727817 | 13.94882127 | 10.75774577 | 7.407456453 | 2.719401332 | 0 | 0 |
| 23.71163099 | 20.76004763 | 19.53563035 | 16.92989063 | 13.64007382 | 10.30937663 | 5.05703383 | 0 | 0 |
| 25.50771297 | 24.71680896 | 21.98557098 | 20.72884383 | 16.62296177 | 90522 92896 | 6.263761866 | 1.041088238 | 0 |
| 28.18941685 | 23.83000325 | 25.48153081 | 19.86999669 | 20.03608903 | 12.68586309 | 7.376652878 | 1.802011553 | 0 |
| 29.00115871 | 26.81317845 | 25.66434397 | 25.10456601 | 18.67532706 | 16.26768914 | 8.489965277 | 3.169509467 | 0 |
| 30.16165766 | 27.13157894 | 29.05504839 | 22.62846143 | 22.39066831 | 16.97396465 | 10.62204043 | 5.426859573 | 0 |
| 31.15503895 | 32.91133941 | 28.78159322 | 27.35555332 | 23.88324777 | 19.20244196 | 10.20505614 | 5.409954789 | 0 |
| 35.33114762 | 32.75446651 | 34.51352339 | 28.78557406 | 21.47962837 | 17.599144 | 11.84017824 | 6.389554011 | 0 |
| 44.01365077 | 37.32313797 | 37.51891996 | 30.15043848 | 26.9186866 | 22.09109058 | 16.27066819 | 8.427737389 | 0.937322405 |

TABLE 4C

| | | | | | | | | |
|---|---|---|---|---|---|---|---|---|
| 2.038818092 | 8.962954388 | 16.03224216 | 20.24133324 | 27.4057281 | 31.34308504 | 37.15630316 | 42.51023667 | 46.78287051 |
| 0 | 5.064996093 | 9.576141288 | 20.45090843 | 29.40551815 | 33.22767504 | 42.19447767 | 40.12616367 | 48.70367392 |
| 0 | 1.995847756 | 10.45075434 | 19.20323636 | 27.9211128 | 33.53374696 | 34.1899445 | 36.42860137 | 44.72194683 |

TABLE 4C-continued

| | | | | | | | | |
|---|---|---|---|---|---|---|---|---|
| 0 | 1.907924653 | 11.97211112 | 22.2521952 | 28.16936574 | 33.05149621 | 34.85306103 | 36.07538168 | 38.47619983 |
| 0 | 1.097948028 | 10.45807223 | 21.18256651 | 25.07733432 | 34.07773965 | 35.86520027 | 42.19995342 | 46.68821323 |
| 0 | 0 | 1.881046438 | 10.56218453 | 21.40243062 | 29.71799167 | 33.8423357 | 37.32238097 | 43.89481779 |
| 0 | 0 | 0.943255241 | 8.731977178 | 18.38390501 | 28.30724899 | 30.44769938 | 37.88553228 | 42.15947101 |
| 0 | 0 | 0 | 0 | 6.68527509 | 21.70347417 | 26.81968821 | 28.91523469 | 37.30706593 |
| 0 | 0 | 0 | 0 | 0 | 5.240843627 | 18.79425229 | 24.14889834 | 31.23650859 |
| 0 | 0 | 0 | 0 | 0 | 3.142579844 | 10.34490193 | 16.93524841 | 22.41948024 |
| 0 | 0 | 0 | 0 | 0 | 0 | 2.160732548 | 9.480986525 | 13.65747271 |
| 0 | 0 | 0 | 0 | 0 | 0 | 0 | 0.91399463 | 7.994755526 |
| 0 | 0 | 0 | 0 | 0 | 0 | 0 | 0 | 0 |
| 0 | 0 | 0 | 0 | 0 | 0 | 0 | 0 | 0 |

| | | | | | | | | |
|---|---|---|---|---|---|---|---|---|
| 50.77270238 | 48.80847529 | 50.38941188 | 59.4340737 | 49.34885743 | 52.47669976 | 42.42399817 | 40.60062614 | 30.04100026 |
| 49.73030641 | 54.42654254 | 59.9778096 | 51.57739023 | 50.48526343 | 51.09458172 | 51.45658662 | 36.07981916 | 34.88485109 |
| 53.28801698 | 53.49551483 | 55.65913148 | 62.94111716 | 61.43486456 | 54.92227751 | 51.73480829 | 50.97002194 | 32.30440764 |
| 43.40233429 | 49.07619445 | 55.90087293 | 75.3029559 | 82.70233108 | 67.04746911 | 55.24455408 | 51.0880836 | 34.57436091 |
| 54.76146535 | 53.55569696 | 58.33556468 | 73.04457443 | 90.63212859 | 93.55550837 | 68.28516126 | 62.74691237 | 36.76706817 |
| 47.7821104 | 54.65238636 | 62.89954911 | 64.86804475 | 84.64376219 | 69.75227405 | 57.15432969 | 50.54546568 | 36.50250007 |
| 42.0700434 | 53.03618674 | 57.26490011 | 57.37115239 | 64.63761538 | 60.47995304 | 53.10239886 | 47.58096384 | 33.33044721 |
| 42.00978885 | 54.10535782 | 55.12945703 | 57.10017444 | 58.67665056 | 52.87583952 | 52.25382531 | 49.81009536 | 35.36736074 |
| 40.51703352 | 39.53402059 | 45.06225787 | 53.32319708 | 57.29446968 | 49.63620602 | 52.23844873 | 45.38247825 | 34.69110389 |
| 27.11169047 | 33.87022573 | 37.04502657 | 45.02162317 | 53.48898291 | 46.51368725 | 49.13237746 | 41.84714114 | 33.60536889 |
| 19.30809717 | 24.35580299 | 29.16807634 | 34.17298441 | 40.0462045 | 42.556071 | 34.91166106 | 32.6846927 | 30.62778691 |
| 19.09464935 | 24.9346622 | 28.91006897 | 31.83502955 | 28.83031869 | 31.62886983 | 32.1513217 | 28.55067785 | 31.78089473 |
| 6.0459004 | 11.42932557 | 20.38833169 | 23.1437172 | 31.7388671 | 28.17417439 | 30.02164622 | 25.36871431 | 23.21382915 |
| 0 | 0 | 0 | 0 | 0 | 0 | 0 | 0 | 0 |

TABLE 4D

| | | | | | | | | |
|---|---|---|---|---|---|---|---|---|
| 27.57736057 | 41.79859755 | 49.20121444 | 48.76689193 | 50.38085829 | 53.71552485 | 52.93526621 | 49.25483118 | 49.36396239 |
| 31.26132608 | 42.86649343 | 51.19157353 | 53.04583708 | 59.22357688 | 60.04694918 | 55.38628994 | 51.98598441 | 46.04499668 |
| 33.00179884 | 46.53999059 | 49.45266513 | 57.89845247 | 58.23383372 | 59.56691031 | 54.50616305 | 53.90322172 | 52.00225074 |
| 34.47773991 | 54.61745605 | 63.91438835 | 64.59402211 | 73.94165848 | 73.01589437 | 61.47802695 | 46.11922644 | 44.06223896 |
| 39.4317475 | 68.71497005 | 72.17970342 | 89.88595569 | 85.74281489 | 72.73429532 | 54.31578472 | 54.16741851 | 45.84904751 |
| 34.94998627 | 49.88399619 | 60.55743101 | 72.81859282 | 77.03393197 | 76.45284182 | 57.82549154 | 56.24900471 | 47.14478868 |
| 33.32600349 | 52.68244859 | 53.21488797 | 59.50668991 | 60.53730735 | 58.53723056 | 55.36299488 | 58.17344963 | 43.68894986 |
| 36.26693573 | 51.1553188 | 46.30959512 | 56.92170186 | 62.4401633 | 58.55697294 | 51.16380162 | 47.19900779 | 37.8132251 |
| 30.47038725 | 52.02165588 | 49.22710429 | 52.26216985 | 58.73097427 | 53.75146039 | 51.02190441 | 40.77428105 | 39.54283337 |
| 33.05807815 | 46.9433428 | 48.61112936 | 47.64037922 | 50.76631658 | 45.58774204 | 36.95068873 | 33.36369315 | 26.27076293 |
| 34.97124234 | 36.4149676 | 37.98756726 | 39.19354723 | 39.33537606 | 35.40085276 | 25.02857144 | 22.99919056 | 20.18914654 |
| 31.02690622 | 31.46204973 | 32.91658858 | 32.51866317 | 30.85733885 | 28.01903551 | 32.48288102 | 23.44194771 | 18.19254031 |

TABLE 4D-continued

| | | | | | | | | |
|---|---|---|---|---|---|---|---|---|
| 23.99587428 | 26.37955229 | 26.36007722 | 28.35627262 | 28.28448871 | 21.52201553 | 20.56223535 | 10.8548631 | 6.15668735 |
| 0 | 0 | 0 | 0 | 0 | 0 | 0 | 0 | 0 |
| 44.52234219 | 37.45282774 | 37.93946981 | 35.3914388 | 26.39445963 | 21.70294472 | 13.53826669 | 9.894846412 | 1.994092183 |
| 45.67457549 | 42.56977982 | 37.44473098 | 36.69555334 | 27.34238898 | 21.3308303 | 9.754318506 | 4.727653072 | 0 |
| 44.37270811 | 37.71010815 | 37.54246844 | 31.88527178 | 28.62871754 | 19.03760464 | 10.26918572 | 2.167816882 | 0 |
| 42.19188736 | 35.50597596 | 31.71224986 | 31.99646126 | 31.13372223 | 19.79469142 | 12.09653471 | 2.056799722 | 0 |
| 46.38528379 | 42.14668118 | 40.00478284 | 34.823878 | 28.30411327 | 20.08925913 | 9.20332487 | 0.921064037 | 0 |
| 41.26183417 | 40.00920076 | 32.0413995 | 32.85424275 | 19.79149092 | 9.794714202 | 1.815707098 | 0 | 0 |
| 37.28816724 | 37.86625365 | 29.0312079 | 26.72602447 | 19.79662766 | 8.962397609 | 1.086645822 | 0 | 0 |
| 34.52663779 | 27.34711742 | 25.40308774 | 18.71559691 | 7.622063796 | 0 | 0 | 0 | 0 |
| 30.03051651 | 24.68375964 | 19.90094063 | 5.246551427 | 0 | 0 | 0 | 0 | 0 |
| 21.45146204 | 18.26011708 | 10.61064097 | 2.729681114 | 0 | 0 | 0 | 0 | 0 |
| 12.94896779 | 9.117120888 | 2.012311256 | 0 | 0 | 0 | 0 | 0 | 0 |
| 7.747874244 | 1.064763313 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 5A

| | | | | | | | | |
|---|---|---|---|---|---|---|---|---|
| 0 | 0 | 0 | 0 | 0 | 1.033617186 | 2.139679483 | 4.311923385 | 3.829156693 |
| 0 | 0 | 0 | 0 | 2.123965521 | 3.743062234 | 5.868516995 | 8.002263344 | 9.336832407 |
| 0 | 0 | 0 | 0.923661582 | 2.812055727 | 6.060594426 | 9.429077721 | 9.553990478 | 13.92344947 |
| 0 | 0 | 0 | 2.723413786 | 4.747199857 | 8.735800126 | 12.04816483 | 15.10187454 | 20.0483466 |
| 0 | 0 | 2.98950397 | 3.058916715 | 7.286702146 | 10.19204334 | 15.06989717 | 20.29699822 | 22.97383848 |
| 0 | 0 | 2.965643987 | 7.146038908 | 10.21792291 | 15.92571213 | 19.71966121 | 20.63377849 | 24.97268762 |
| 0 | 0 | 4.811754952 | 10.03286482 | 13.72080432 | 19.74431648 | 19.77006395 | 19.86496012 | 25.11409848 |
| 0 | 0.987386556 | 5.466376526 | 9.015014808 | 18.03983072 | 20.4665129 | 21.22296607 | 23.9327181 | 26.2492401 |
| 0 | 1.921719388 | 8.406066837 | 12.45344007 | 18.11100035 | 20.74088281 | 22.13217705 | 26.03508519 | 26.49952586 |
| 0 | 2.874516198 | 8.337505464 | 16.33806113 | 21.96154113 | 20.85929828 | 24.37605027 | 26.35883693 | 26.5411535 |
| 0 | 4.742516309 | 9.711844238 | 18.27002395 | 21.00394768 | 24.75561896 | 27.04746228 | 27.38958921 | 32.13344304 |
| 0 | 6.524020332 | 10.77091612 | 16.60779523 | 21.26078894 | 22.56897278 | 27.11578896 | 30.12319576 | 32.08972605 |
| 0 | 6.432228289 | 11.8481467 | 18.4473635 | 21.49986244 | 29.84226449 | 35.09298442 | 33.1397587 | 39.53367049 |
| 0.922009699 | 7.835565217 | 13.56371865 | 19.91613469 | 25.62818197 | 32.70718254 | 35.2217972 | 37.62803242 | 42.33604985 |
| 5.46854594 | 5.320750251 | 3.226996619 | 0.925002876 | 0 | 0 | 0 | 0 | 0 |
| 6.438258837 | 5.997097157 | 2.736570133 | 1.955342267 | 1.008303605 | 0 | 0 | 0 | 0 |
| 18.16911751 | 16.4745824 | 14.82262941 | 10.63537549 | 4.781660343 | 0 | 0 | 0 | 0 |
| 21.5730676 | 23.9598869 | 22.92129001 | 24.1171731 | 19.92360135 | 10.2306588 | 0 | 0 | 0 |
| 21.19238471 | 22.72764693 | 25.31618808 | 25.73755121 | 22.81340064 | 13.8678717 | 4.92425327 | 0 | 0 |
| 25.07599762 | 23.51469868 | 25.1965529 | 22.00234023 | 21.65798859 | 18.49517411 | 9.979967346 | 0 | 0 |
| 25.56841174 | 23.84062213 | 27.39390108 | 24.18855995 | 23.49754055 | 19.13783597 | 15.25051341 | 10.59350284 | 0 |

TABLE 5A-continued

| | | | | | | | | |
|---|---|---|---|---|---|---|---|---|
| 26.41484096 | 28.79557191 | 26.50530552 | 24.62787167 | 22.20041039 | 20.94293123 | 14.66646319 | 11.07316123 | 9.88801785 |
| 28.37307526 | 30.77409334 | 27.47175341 | 24.08902694 | 24.75189713 | 20.62749403 | 18.57655667 | 12.11294318 | 9.187249056 |
| 30.80565112 | 30.8985059 | 29.7538432 | 30.71291107 | 23.16697307 | 23.44752033 | 18.20922088 | 16.5098156 | 14.42173192 |
| 33.50672068 | 35.38687925 | 35.38247804 | 32.3088057 | 27.61444674 | 31.52366187 | 25.28415267 | 23.53013768 | 18.8607061 |
| 39.1970102 | 40.19904366 | 37.15801988 | 36.74475882 | 36.03017156 | 30.37421328 | 31.27215149 | 27.44701846 | 22.77059089 |
| 40.82303633 | 41.50122038 | 38.83103333 | 39.52970284 | 31.6397336 | 29.13415283 | 28.92988163 | 28.48259493 | 25.16637659 |
| 43.56613921 | 46.12202066 | 44.59411394 | 42.00200736 | 40.0118275 | 41.58372604 | 40.94080517 | 32.55502793 | 26.30802911 |

TABLE 5B

| | | | | | | | | |
|---|---|---|---|---|---|---|---|---|
| 0 | 0 | 0 | 0 | 0.964912403 | 2.070076458 | 4.201423484 | 6.210396398 | 7.589824309 |
| 0 | 0 | 0 | 0 | 0.916716423 | 4.590921136 | 6.578788125 | 9.440203886 | 10.73745309 |
| 0 | 0 | 0.411605786 | 6.522478937 | 11.02786417 | 17.44671421 | 20.83517394 | 17.09496823 | 13.074388 |
| 0 | 0 | 0 | 10.62184157 | 21.3314593 | 21.40336602 | 26.04819351 | 23.07662297 | 23.82219474 |
| 0 | 0 | 5.01786091 | 14.92952326 | 23.78029939 | 22.42310917 | 23.37718073 | 22.32896977 | 25.18007881 |
| 0 | 0 | 9.491333277 | 18.46515013 | 24.0285412 | 25.41773553 | 26.79148696 | 23.42718852 | 24.4100446 |
| 0 | 9.575295022 | 14.39252452 | 21.50288245 | 22.46178079 | 24.96333456 | 28.12893971 | 26.60509701 | 23.09487691 |
| 9.653516962 | 11.00310393 | 16.4815171 | 20.54074552 | 22.07087846 | 25.24403884 | 30.58531325 | 25.22536765 | 27.13266294 |
| 9.843492965 | 13.21367147 | 19.4090159 | 19.30858167 | 23.88187352 | 26.375306 | 27.3812384 | 27.04786158 | 28.52394033 |
| 13.75167969 | 15.82043357 | 21.44442587 | 23.79713361 | 26.90228463 | 26.52610692 | 30.37727538 | 32.79883192 | 31.22496877 |
| 21.83656536 | 20.12161495 | 23.54957538 | 26.30309292 | 32.54728985 | 34.20693407 | 30.86596395 | 36.08278966 | 32.50154115 |
| 25.20117741 | 27.43504979 | 29.39456347 | 28.1464481 | 30.23626832 | 37.2156888 | 36.09848923 | 34.94419068 | 36.77225318 |
| 28.50118499 | 26.80728261 | 31.24972154 | 35.1268345 | 33.8821765 | 39.56208989 | 40.38777533 | 43.99818498 | 34.73780323 |
| 26.50768851 | 29.17152051 | 38.0522241 | 42.52668911 | 39.80307948 | 43.83168166 | 42.92055247 | 41.53002215 | 47.19552015 |

| | | | | | | | | |
|---|---|---|---|---|---|---|---|---|
| 7.187989484 | 5.211556427 | 2.701273215 | 1.031623236 | 0 | 0 | 0 | 0 | 0 |
| 9.180820103 | 7.969493452 | 6.541328829 | 2.566991274 | 1.008521493 | 0 | 0 | 0 | 0 |
| 11.90021131 | 10.45836044 | 8.426078981 | 4.729306251 | 2.144539271 | 0 | 0 | 0 | 0 |
| 20.28334654 | 16.31267772 | 11.55286916 | 7.491564824 | 5.409139024 | 3.19734333 | 0 | 0 | 0 |
| 21.27584765 | 20.06901761 | 13.91659451 | 9.332705015 | 8.5525609 | 2.828765824 | 3.093349424 | 0 | 0 |
| 25.10284013 | 22.69288874 | 19.39727817 | 13.94882127 | 10.75774577 | 7.407456453 | 2.719401332 | 0 | 0 |
| 23.71163099 | 20.76004763 | 19.53563035 | 16.92989063 | 13.64007382 | 10.30937663 | 5.05706683 | 0 | 0 |
| 25.50771297 | 24.71680896 | 21.98557098 | 20.72884383 | 16.62296177 | 9.052292896 | 6.263761866 | 1.041088238 | 0 |
| 28.18941675 | 23.83000325 | 25.48153081 | 19.86999669 | 20.03608903 | 12.68586309 | 7.376652878 | 1.802011553 | 0 |
| 29.00115871 | 26.81317845 | 25.66434397 | 25.10456601 | 18.67532706 | 16.26768914 | 8.489965277 | 3.169509467 | 0 |
| 30.16165766 | 27.13157894 | 29.05504839 | 22.62846143 | 22.39066831 | 16.97386465 | 10.62204043 | 5.426859573 | 0 |
| 31.15503895 | 32.91133941 | 28.78159322 | 27.35555332 | 23.88324777 | 19.20244196 | 10.20505614 | 5.409954789 | 0 |
| 35.33114762 | 32.75446651 | 34.51352339 | 28.78557406 | 21.47962837 | 17.599144 | 11.84017824 | 6.389554011 | 0 |
| 44.01365077 | 37.32313797 | 37.51891996 | 30.15043848 | 26.9186866 | 22.09109058 | 16.27066819 | 8.427737389 | 0.937322405 |

TABLE 5C

| | | | | | | | | |
|---|---|---|---|---|---|---|---|---|
| 2.038818092 | 8.962954388 | 16.03224216 | 20.24133324 | 27.4057281 | 31.34308504 | 37.15630316 | 42.51023667 | 46.78287051 |
| 0 | 5.064996093 | 9.576141288 | 20.45090843 | 29.40551815 | 33.22767504 | 42.19447767 | 40.12616367 | 48.70367392 |
| 0 | 1.995847756 | 10.45075434 | 19.20323636 | 27.9211128 | 33.53374696 | 34.1899445 | 36.42860137 | 44.72194683 |
| 0 | 1.907924653 | 11.97211112 | 22.2521952 | 28.16936574 | 33.05149621 | 34.85306103 | 36.07538168 | 38.47619983 |
| 0 | 1.097948028 | 10.45807223 | 21.18256651 | 25.07733432 | 34.07773965 | 35.86520027 | 42.19995342 | 46.68821323 |
| 0 | 0 | 1.881046438 | 10.56218453 | 21.40243062 | 29.71799167 | 33.8423357 | 37.32238097 | 43.89481779 |
| 0 | 0 | 0.943255241 | 8.731977178 | 18.38390501 | 28.30724899 | 30.44769938 | 37.88553228 | 42.15947101 |
| 0 | 0 | 0 | 0 | 6.68527509 | 21.70347417 | 26.81968821 | 28.91523469 | 37.30706593 |
| 0 | 0 | 0 | 0 | 0 | 5.240843627 | 18.79425229 | 24.14889834 | 31.23650859 |
| 0 | 0 | 0 | 0 | 0 | 3.142579844 | 10.34490193 | 16.93524841 | 22.41948024 |
| 0 | 0 | 0 | 0 | 0 | 0 | 2.160732548 | 9.480986525 | 13.65747271 |
| 0 | 0 | 0 | 0 | 0 | 0 | 0 | 0.91399463 | 7.994755526 |
| 0 | 0 | 0 | 0 | 0 | 0 | 0 | 0 | 0 |
| 0 | 0 | 0 | 0 | 0 | 0 | 0 | 0 | 0 |

| | | | | | | | | |
|---|---|---|---|---|---|---|---|---|
| 50.77270238 | 48.80847529 | 50.38941188 | 59.4340737 | 49.34885743 | 52.47669976 | 42.42399817 | 40.60062614 | 30.04100026 |
| 49.73030641 | 54.42654254 | 59.9778096 | 51.57739023 | 50.48526343 | 51.09458172 | 51.45658662 | 36.07981916 | 34.88485109 |
| 53.28801698 | 53.49551483 | 55.65913148 | 62.94111716 | 61.43486456 | 54.92227751 | 51.73480829 | 50.97002194 | 32.30440764 |
| 43.40233429 | 49.07619445 | 55.90087293 | 75.3029559 | 82.70233108 | 67.04746911 | 55.24455408 | 51.0880836 | 34.57436091 |
| 54.76146535 | 53.55569696 | 58.33556468 | 73.04457443 | 90.63212859 | 93.55550837 | 68.28516126 | 62.74691237 | 36.76706817 |
| 47.7821104 | 54.65238636 | 62.89954911 | 64.86804475 | 84.64376219 | 69.75227405 | 57.15432969 | 50.54546568 | 36.50250007 |
| 42.0700434 | 53.03618674 | 57.26490011 | 57.37115239 | 64.63761538 | 60.47995304 | 53.10239886 | 47.58096384 | 33.33044721 |
| 42.00978885 | 54.10535782 | 55.12945703 | 57.10017444 | 58.67665056 | 52.87583952 | 52.25382531 | 49.81009536 | 35.36736074 |
| 40.51703352 | 39.53402059 | 45.06225787 | 53.32319708 | 57.29446968 | 49.63620602 | 52.23844873 | 45.38247825 | 34.69110389 |
| 27.11169047 | 33.87022573 | 37.04502657 | 45.02162317 | 53.48898291 | 46.51368725 | 49.13237746 | 41.84714114 | 33.60536889 |
| 19.30809717 | 24.35580299 | 29.16807634 | 34.17298441 | 40.0462045 | 42.556071 | 34.91166106 | 32.6846927 | 30.62778691 |
| 19.09464935 | 24.9346622 | 28.91006897 | 31.83502955 | 28.83031869 | 31.62886983 | 32.1513217 | 28.55067785 | 31.78089473 |
| 6.0459004 | 11.42932557 | 20.38833169 | 23.1437172 | 31.7388671 | 28.17417439 | 30.02164622 | 25.36871431 | 23.21382915 |
| 0 | 0 | 0 | 0 | 0 | 0 | 0 | 0 | 0 |

TABLE 5D

| | | | | | | | | |
|---|---|---|---|---|---|---|---|---|
| 27.57736057 | 41.79859755 | 49.20121444 | 48.76689193 | 50.38085829 | 53.71552485 | 52.93526621 | 49.25483118 | 49.36396239 |
| 31.26132608 | 42.86649343 | 51.19157353 | 53.04583708 | 59.22357688 | 60.04694918 | 55.38628994 | 51.98598441 | 46.04499668 |
| 33.00179884 | 46.53999059 | 49.45266513 | 57.89845247 | 58.23383372 | 59.56691031 | 54.50616305 | 53.90322172 | 52.00225074 |
| 34.47773991 | 54.61745605 | 63.91438835 | 64.5940221 | 73.94165848 | 73.01589437 | 61.4780269 | 46.11922644 | 44.06223896 |
| 39.4317475 | 68.71497005 | 72.17970342 | 89.88595569 | 85.74281489 | 72.73429532 | 54.31578472 | 54.16741851 | 45.84904751 |
| 34.94998627 | 49.88399619 | 60.55743101 | 72.81859282 | 77.03393197 | 76.45284182 | 57.82549154 | 56.24900471 | 47.14478868 |
| 33.32600349 | 52.68244859 | 53.21488797 | 59.50668991 | 60.53730735 | 58.53723056 | 55.36299488 | 58.17344963 | 43.68894986 |
| 36.26693573 | 51.1553188 | 46.30959512 | 56.92170186 | 62.4401633 | 58 55697294 | 51.16380162 | 47.19900779 | 37.8132251 |
| 30.47038725 | 52.02165588 | 49.22710429 | 52.26216985 | 58.73097427 | 53.75146039 | 51.02190441 | 40.77428105 | 39.54283337 |
| 33.05807815 | 46.9433428 | 48.61112936 | 47.64037922 | 50.76631658 | 45.58774204 | 36.95068873 | 33.36369315 | 26.27076293 |

TABLE 5D-continued

| | | | | | | | | |
|---|---|---|---|---|---|---|---|---|
| 34.97124234 | 36.4149676 | 37.98756726 | 39.19354723 | 39.33537606 | 35.40085276 | 25.02857144 | 22.99919056 | 20.18914654 |
| 31.02690622 | 31.46204973 | 32.91658858 | 32.51866317 | 30.85733885 | 28.01903551 | 32.48288102 | 23.44194771 | 18.19254031 |
| 23.99587428 | 26.37955229 | 26.36007722 | 28.35627262 | 28.28448871 | 21.52201553 | 20.56223535 | 10.8548631 | 6.15668735 |
| 0 | 0 | 0 | 0 | 0 | 0 | 0 | 0 | 0 |
| 44.52234219 | 37.45282774 | 37.93946981 | 35.3914388 | 26.39445963 | 21.70294472 | 13.53826669 | 9.894846412 | 1.994092183 |
| 45.67457549 | 42.56977982 | 37.44473098 | 36.69555334 | 27.34238898 | 21.3308303 | 9.754318506 | 4.727653072 | 0 |
| 44.37270811 | 37.71010815 | 37.54246844 | 31.88527178 | 28.62871754 | 19.03760464 | 10.26918572 | 2.167816882 | 0 |
| 42.19188736 | 35.50597596 | 31.71224986 | 31.99646126 | 31.13372223 | 19.79469142 | 12.09653471 | 2.056799722 | 0 |
| 46.38528379 | 42.14668118 | 40.00478284 | 34.823878 | 28.30411327 | 20.08925913 | 9.20332487 | 0.921064037 | 0 |
| 41.26183417 | 40.00920076 | 32.0413995 | 32.85424275 | 19.79149092 | 9.794714202 | 1.815707098 | 0 | 0 |
| 37.28816724 | 37.86625365 | 29.0312079 | 26.72602447 | 19.79662766 | 8.962397609 | 1.086645822 | 0 | 0 |
| 34.52663779 | 27.34711742 | 25.40308774 | 18.71559691 | 7.622063796 | 0 | 0 | 0 | 0 |
| 30.03051651 | 24.68375964 | 19.90094063 | 5.246551427 | 0 | 0 | 0 | 0 | 0 |
| 21.45146204 | 18.26011708 | 10.61064097 | 2.729681114 | 0 | 0 | 0 | 0 | 0 |
| 12.94896779 | 9.117120888 | 2.012311256 | 0 | 0 | 0 | 0 | 0 | 0 |
| 7.747874244 | 1.064763313 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

The variances of all the data in $C_1$ and $C_2$ are calculated; $D_1=5.7312$, $D_2=5.6865$; the ideal pressure matrix $B_2$ corresponding to $D_2$ is selected as the ideal pressure and is outputted to the actuation controller; and the pressure of each of the actuators is adjusted by controlling the current flowing through the shape memory alloy wire in the actuator so that the pressure of the actuator reaches the value of $B_2$.

In a comfort driving mode, a main goal of the central controller is the riding comfort of the occupants. An actuation driver adjusts the length of the actuators based on the ideal matrix $B_n$; and in a sport driving mode, the central controller identifies the human characteristics of the occupants and focuses on determining the contact outline of the human bodies and the seats, i.e., the boundary between the invalid actuators and the valid actuators. The actuators close to the boundary outside the boundary are defined as actuators on a body side. When adjusting the actuators, besides ensuring certain comfort, the actuation driver focuses on extending the actuators on the body side so that the seat profiles around the human bodies are protruded to wrap the human bodies. In the two modes, the actuation driver heats the shape memory wires in a manner of pulse width modulation.

During extension and contraction of the actuators, the temperature sensors mounted on shape memory driving units of the actuators or the resistance measurers for measuring the resistance of the shape memory wires in real time transfer the measured data to the central controller in real time. The central controller receives the temperature or resistance values of the shape memory wires, and obtains the lengths of the actuators according to a corresponding relationship between the temperature or resistance values of the shape memory alloy wires and the lengths; and the corresponding relationship can be measured in advance. During measurement, a relationship between the temperature or resistance values of the shape memory alloy wires used in the automobile seats and the lengths of the actuators after the shape memory alloy wires are mounted in the actuators is obtained; and a fixed corresponding relationship is formed and stored in the central controller for query by the central controller. At points without test data, the corresponding relationship is obtained in an interpolation manner. Thus, the actuation controller can accurately control the lengths of the actuators.

Meanwhile, in order to ensure safety, the central controller also calculates the heat quantity of the shape memory driver according to the current flowing through the shape memory wires and the current applying time. A calculation formula is as follows:

$$Q=\Sigma(I^2*R*\Delta t)-Q(t)$$

In the formula, Q is the heat quantity; I is the measured current of the memory alloy wire; R is the resistance of the memory alloy wire; $\Delta t$ is the sampling interval time; and Q(t) is heat transferred to the outside by the actuators and can be calibrated after measurement by specific experiments.

The current flowing through the shape memory wires is adjusted in real time according to the heat quantity so as to prevent the apparatus from failing or firing due to overheating.

Although implementation solutions of the present invention are disclosed as above, the present invention is not limited to applications described in the description and embodiments, and can be completely applicable to various fields suitable for the present invention. Those skilled in the art can easily make other modifications. Thus, the present invention is not limited to specific details and figures shown and described herein without departing from general concepts limited by claims and equivalent scopes.

We claim:

1. An actuator array automobile seat profile adaptive-adjusting apparatus, comprising: a seat back plate, a seat bottom plate, and a seat profile layer covered thereon; and a plurality of shape memory material actuators arranged and disposed at least one of between the seat profile layer and the seat back plate or between the seat profile layer and the seat bottom plate, wherein each of the shape memory material actuators comprises: a plurality of sequentially nested sleeves, wherein the sleeve located at a tail end is fixed to at least one of the seat back plate and the seat bottom plate, and the sleeve located at a front end is fixed to the seat profile layer; a return spring, wherein one end of the return spring is connected with a bottom surface of the sleeve located at the tail end, the other end of the return spring is connected with a top surface of the sleeve located at the front end, and an outwardly extending elastic force is applied to the sleeves through the return spring; a pulley block fixedly arranged in the sleeve located at the tail end; and a memory alloy wire wound on the pulley block, wherein one end of the memory alloy wire is connected with the bottom surface of the sleeve located at the tail end, the other end is connected with the top surface of the sleeve located at the front end, and the memory alloy wire is shortened during energization.

2. The actuator array automobile seat profile adaptive-adjusting apparatus according to claim 1, wherein the seat profile layer comprises an inner profile supporting layer and an outer elastic covering layer.

3. The actuator array automobile seat profile adaptive-adjusting apparatus according to claim 2, wherein a plurality of protrusions are further disposed inside the profile supporting layer; and the protrusions are fixedly connected with the top of the sleeve located at the front end.

4. The actuator array automobile seat profile adaptive-adjusting apparatus according to claim 1, wherein the apparatus further comprises a controller electrically connected with the memory alloy wire through a multi-core cable to energize the memory alloy wire.

5. The actuator array automobile seat profile adaptive-adjusting apparatus according to claim 1 wherein the pulley block comprises: two supporting vertical columns arranged in parallel, wherein the supporting vertical columns are fixed to the sleeve located at the tail end; two rotating shafts arranged in parallel, wherein both ends of the rotating shafts are respectively fixed to the two supporting vertical columns; and a plurality of pulleys rotatably disposed on the rotating shafts.

6. The actuator array automobile seat profile adaptive-adjusting apparatus according to claim 1, wherein pressure sensors are disposed on the shape memory material actuators to measure pressure from an external load acting on the shape memory material actuators.

7. The actuator array automobile seat profile adaptive-adjusting apparatus according to claim 6, wherein temperature sensors are disposed in the shape memory material actuators to measure a temperature of the memory alloy wire.

8. The actuator array automobile seat profile adaptive-adjusting apparatus according to claim 6, wherein resistance measurers are disposed in the shape memory material actuators to measure a resistance value of the memory alloy wire.

* * * * *